(12) United States Patent
Gong et al.

(10) Patent No.: US 11,109,322 B2
(45) Date of Patent: Aug. 31, 2021

(54) SYSTEMS AND METHOD OF POWER CONTROL FOR UPLINK TRANSMISSIONS

(71) Applicant: Huawei Technologies Co., Ltd., Shenzhen (CN)

(72) Inventors: Zhengwei Gong, Ottawa (CA); Amine Maaref, Ottawa (CA); Yu Cao, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/542,344

(22) Filed: Aug. 16, 2019

(65) Prior Publication Data

US 2019/0387479 A1 Dec. 19, 2019

Related U.S. Application Data

(63) Continuation of application No. PCT/CN2018/080134, filed on Mar. 23, 2018.

(60) Provisional application No. 62/476,707, filed on Mar. 24, 2017.

(51) Int. Cl.
*H04W 4/00* (2018.01)
*H04W 52/14* (2009.01)
*H04W 52/08* (2009.01)
*H04W 52/24* (2009.01)
*H04W 72/12* (2009.01)

(52) U.S. Cl.
CPC ......... *H04W 52/146* (2013.01); *H04W 52/08* (2013.01); *H04W 52/242* (2013.01); *H04W 72/1268* (2013.01)

(58) Field of Classification Search
CPC . H04W 52/08; H04W 52/146; H04W 52/242; H04W 72/1268
See application file for complete search history.

(56) References Cited

U.S. PATENT DOCUMENTS

| | | | |
|---|---|---|---|
| 2014/0177531 A1* | 6/2014 | Imamura | H04L 5/0035 370/328 |
| 2014/0295909 A1* | 10/2014 | Ouchi | H04W 52/40 455/522 |
| 2014/0329553 A1 | 11/2014 | Nakashima et al. | |
| 2015/0146545 A1* | 5/2015 | Davydov | H04W 52/241 370/252 |
| 2015/0208366 A1 | 7/2015 | Papasakellariou et al. | |
| 2016/0295518 A1 | 10/2016 | Cheng et al. | |
| 2017/0026914 A1 | 1/2017 | Madan et al. | |

FOREIGN PATENT DOCUMENTS

| | | |
|---|---|---|
| CN | 103327630 A | 9/2013 |
| CN | 104994582 A | 10/2015 |
| CN | 101908916 B | 3/2016 |
| CN | 106413052 A | 2/2017 |
| CN | 106455030 A | 2/2017 |
| CN | 106465311 A | 2/2017 |
| EP | 2849517 A1 | 3/2015 |
| WO | 2011153890 A1 | 12/2011 |

* cited by examiner

*Primary Examiner* — Minh Trang T Nguyen
(74) *Attorney, Agent, or Firm* — Slater Matsil, LLP

(57) ABSTRACT

Methods are disclosed that enable a user equipment (UE) to receive cell specific, UE specific and, in some embodiments, Physical Uplink Shared Channel (PUSCH) specific parameters from a network side component, such as a transmit/receive point, and use that information to set at least one PUSCH transmit power when transmitting to the network side.

20 Claims, 15 Drawing Sheets

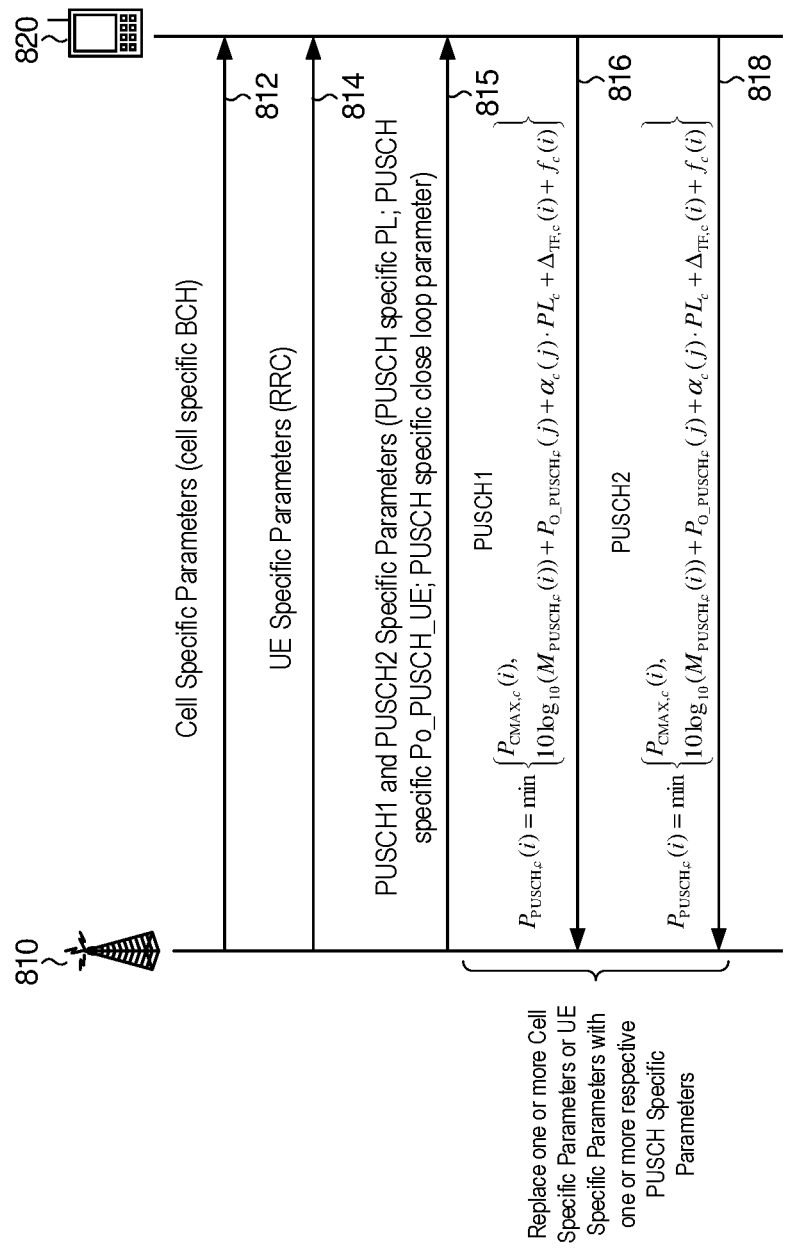

SYSTEMS AND METHOD OF POWER CONTROL FOR UPLINK TRANSMISSIONS

CROSS-REFERENCE TO RELATED APPLICATIONS

This application is a continuation of PCT Application No. PCT/CN2018/080134, entitled "System and Method of Power Control for Uplink Transmissions," filed Mar. 23, 2018, which claims the benefit of U.S. Provisional Application No. 62/476,707, entitled "System and Method of Power Control for Uplink Transmissions," filed on Mar. 24, 2017, which applications are hereby incorporated herein by reference.

TECHNICAL FIELD

The present disclosure relates generally to a system and method of wireless communications, and, in particular embodiments, to a system and method of power control for uplink transmissions.

BACKGROUND

Unlike LTE networks where each cell is serviced by one transmit/receive point (TRP) with a unique cell ID, in a New Radio (NR) system each NR cell may include multiple TRPs using the same NR cell ID, where the NR cell may cover a much broader area. Such NR systems may support grant free transmissions and multi-beam communications. Grant free physical uplink shared channel (PUSCH) transmissions can include PUSCH without grant scheduling but with radio resource control (RRC) connection (e.g. RRC connective state) or can include PUSCH without grant scheduling and without RRC connection (e.g. IDLE state or RRC_INACTIVE state). Given the different ways in which such NR systems operate there is a need for improved uplink power control schemes for use in such systems.

SUMMARY

According to a first aspect of the disclosure, there is provided a method involving: determining a first transmission power for transmitting a first physical uplink shared channel; transmitting the first physical uplink shared channel at the first transmission power on a first spatial resource; determining a second transmission power for transmitting a second physical uplink shared channel; and transmitting the second physical uplink shared channel at the second transmission power on a second spatial resource that is different from the first spatial resource; wherein the first transmission power is different from the second transmission power; and wherein the first spatial resource and the second spatial resource are identified with different resource indices.

In some embodiments, the first spatial resource and the second spatial resource are at least one of: respective transmission beams; respective transmission beam pair links; respective panels; respective QCL groups; respective antenna ports; or respective transmission layers.

In some embodiments, at least one of: the first transmission power is derived from power parameters specific to the first physical uplink channel; and the second transmission power is derived from power parameters specific to the second physical uplink channel.

In some embodiments, the power parameters specific to the first physical uplink channel and the power parameters specific to the second physical uplink channel include one or more of a respective PUSCH specific pathloss parameter, a respective PUSCH specific $P_{o\_UE\_PUSCH}$ parameter, or one or more respective PUSCH specific closed-loop factors.

In some embodiments, the one or more respective PUSCH specific closed-loop factors is based on one or more of transmit power control or transmission format indications.

In some embodiments, the respective PUSCH specific pathloss parameter is specific in a downlink reference signal (DL RS) configuration.

In some embodiments, the first transmission power and the second transmission power are further derived from common cell specific power parameters.

In some embodiments, the common cell specific power parameters include $P_{o\_PUSCH\_nominal}$.

In some embodiments, the power parameters specific to the first physical uplink channel and the power parameters specific to the second physical uplink channel are represented as offsets from common cell specific power parameters or UE specific power parameters.

In some embodiments, the method further involves receiving at least one of: one or more cell specific power parameters; one or more UE specific power parameters; one or more power parameters specific to the first physical uplink shared channel; and one or more power parameters specific to the second physical uplink shared channel.

According to a second aspect of the disclosure, there is provided a user equipment (UE) including a processor and a computer-readable medium, having stored thereon computer-executable instructions. The computer-executable instructions, when executed by the processor, cause the UE to: determine a first transmission power for transmitting a first physical uplink shared channel; transmit the first physical uplink shared channel at the first transmission power on a first spatial resource; determine a second transmission power for transmitting a second physical uplink shared channel; and transmit the second physical uplink shared channel at the second transmission power on a second spatial resource that is different from the first resource; wherein the first transmission power is different from the second transmission power.

In some embodiments, the first spatial resource and the second spatial resource are at least one of: respective transmission beams; respective transmission beam pair links; respective panels; respective QCL groups; respective antenna ports; or respective transmission layers.

In some embodiments, at least one of: the first transmission power is derived from power parameters specific to the first physical uplink channel; and the second transmission power is derived from power parameters specific to the second physical uplink channel.

In some embodiments, the power parameters specific to the first physical uplink channel and the power parameters specific to the second physical uplink channel include one or more of a respective PUSCH specific pathloss parameter, a respective PUSCH specific $P_{o\_UE\_PUSCH}$ parameter, or one or more respective PUSCH specific closed-loop factors.

In some embodiments, the respective PUSCH specific pathloss parameter is specific in a downlink reference signal (DL RS) configuration.

According to a third aspect of the disclosure, there is provided a method involving: receiving a first physical uplink shared channel on a first spatial resource provisioned using one or more physical uplink shared channel power parameters specific to the first physical uplink shared channel; and receiving a second physical uplink shared channel on a second spatial resource provisioned using one or more physical uplink shared channel power parameters specific to the second physical uplink shared channel.

In some embodiments, the first spatial resource and the second spatial resource are at least one of: respective transmission beams; respective transmission beam pair links; respective panels; respective QCL groups; respective antenna ports; or respective transmission layers.

In some embodiments, the method further involves transmitting at least one of: one or more cell specific power parameters; one or more UE specific power parameters; one or more power parameters specific to a first physical uplink shared channel; and one or more power parameters specific to a second physical uplink shared channel.

In some embodiments, the one or more physical uplink shared power parameters specific to the first physical uplink channel and the one or more physical uplink shared power parameters specific to the second physical uplink channel include one or more of a respective PUSCH specific pathloss parameter, a respective PUSCH specific $P_{o\_UE\_PUSCH}$ parameter, or one or more respective PUSCH specific closed-loop factors.

In some embodiments, the one or more respective PUSCH specific pathloss parameter is specific in a downlink reference signal (DL RS) configuration.

In some embodiments, the one or more respective PUSCH closed-loop factors can be based on one or more of transmit power control or transmission format indications.

In some embodiments, the one or more physical uplink shared channel power parameters are further derived from common cell specific power parameters.

In some embodiments, the common cell specific power parameters include $P_{o\_PUSCH\_nominal}$.

In some embodiments, the one or more physical uplink shared power parameters specific to the first physical uplink channel and the one or more physical uplink shared power parameters specific to the second physical uplink channel are represented as offsets from the one or more cell specific power parameters or the one or more UE specific power parameters.

According to a fourth aspect of the disclosure, there is provided a device including a processor and a computer-readable medium, having stored thereon computer-executable instructions. The computer-executable instructions, when executed by the processor, cause the device to: receive a first physical uplink shared channel on a first spatial resource provisioned using one or more physical uplink shared channel power parameters specific to the first physical uplink shared channel; and receive a second physical uplink shared channel on a second spatial resource provisioned using one or more physical uplink shared channel power parameters specific to the second physical uplink shared channel.

In some embodiments, the first spatial resource and the second spatial resource are at least one of: respective transmission beams; respective transmission beam pair links; respective panels; respective QCL groups; respective antenna ports; or respective transmission layers.

In some embodiments, the device further includes computer-executable instructions, that when executed by the processor, cause the device to transmit at least one of: one or more cell specific power parameters; one or more UE specific power parameters; one or more power parameters specific to a first physical uplink shared channel; and one or more power parameters specific to a second physical uplink shared channel.

In some embodiments, the one or more physical uplink shared power parameters specific to the first physical uplink channel and the one or more physical uplink shared power parameters specific to the second physical uplink channel include one or more of a respective PUSCH specific pathloss parameter, a respective PUSCH specific $P_{o\_UE\_PUSCH}$ parameter, or one or more respective PUSCH specific closed-loop factors.

In some embodiments, the one or more respective PUSCH specific pathloss parameter is specific in a downlink reference signal (DL RS) configuration.

In some embodiments, the one or more respective PUSCH closed-loop factors can be based on one or more of transmit power control or transmission format indications.

In some embodiments, the one or more physical uplink shared channel power parameters are further derived from common cell specific power parameters.

In some embodiments, the common cell specific power parameters include $P_{o\_PUSCH\_nominal}$.

In some embodiments, the one or more physical uplink shared power parameters specific to the first physical uplink channel and the one or more physical uplink shared power parameters specific to the second physical uplink channel are represented as offsets from the one or more cell specific power parameters or the one or more UE specific power parameters.

BRIEF DESCRIPTION OF THE DRAWINGS

FIG. 8 illustrates another embodiment of UL power control in accordance with the present disclosure.

DETAILED DESCRIPTION OF ILLUSTRATIVE EMBODIMENTS

Figure 1:
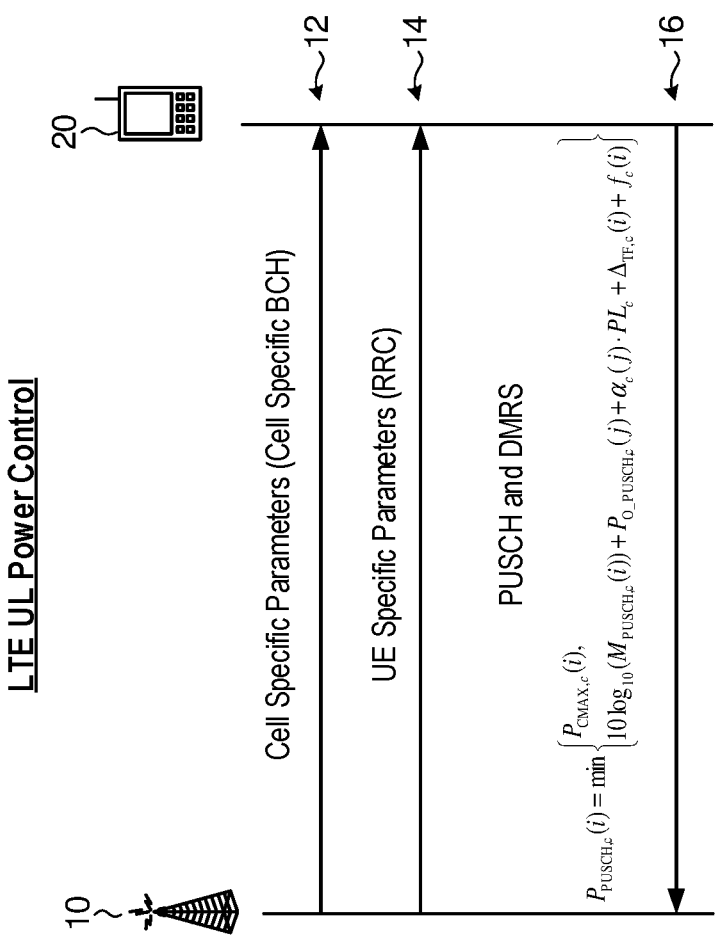
FIG. 1 illustrates UL power control in LTE.

FIG. 1 illustrates a signal flow diagram in which a transmit/receive point (TRP) 10 is in communication with a UE 20. The TRP 10 sends 12 a message to the UE 20 that includes cell specific parameters. This message may be sent on a cell specific broadcast channel (BCH). The TRP 10 also sends 14 a message to the UE 20 that includes UE specific parameters. This message may be sent using a radio resource control (RRC) message. The UE 20 can then send 16 physical uplink shared channel (PUSCH) and demodulation reference signal (DMRS) information to the TRP 10. There are three types of PUSCH that may be transmitted by the UE. A first PUSCH type is scheduled with a dynamic grant (GRANT). A second PUSCH type is semi-persistently scheduled with a dynamic grant (SPS). A third PUSCH type is a random access response grant (MSG3).

As shown in FIG. 1, in LTE, the transmission power for PUSCH can be derived as $\min\{P_{c,max}(i), P_{PUSCH}(i)\}$ by the UE following the equation $$P_{PUSCH}(i) = 10 \log_{10}(M_{PUSCH}) + P_{O\_PUSCH} + \alpha \cdot PL + \Delta_{TF}(i) + f(i)$$

wherein the $P_{O\_PUSCH}$ may be different for each of the three PUSCH types and the variable i is for a respective PUSCH transmission period and $P_{c,max}(i)$ is one UE-specific maximum transmission power which can be used for one UL transmission during subframe i. $M_{PUSCH}$ is the bandwidth of the PUSCH resource assignment expressed in number of resource blocks. PL is the downlink path loss estimate calculated in the UE. $\alpha$ is compensation factor for pathloss. $\Delta_{TF}(i)$ is adjusted based on dynamic assignment parameters related to MCS. f(i) is a TPC command within the dynamic assignment to adjust the power offset.

For the first PUSCH type, which is scheduled with dynamic DL assignment or grant, $P_{O\_PUSCH}$ can be defined as a PUSCH initial target power composed of the sum of a cell specific component $P_{O\_NOMINAL\_PUSCH}$ provided from a broadcasting channel (e.g. system information block) and a UE specific component $P_{O\_UE\_PUSCH}$ provided by a dedicated channel (e.g. RRC), which can be expressed in the form $$P_{O\_PUSCH}(1) = P_{O\_NOMINAL\_PUSCH} + P_{O\_UE\_PUSCH}$$

For the second PUSCH type, which is semi-persistently scheduled without dynamic DL assignment or grant, $P_{O\_PUSCH}$ can be defined as a PUSCH initial target power composed of the sum of two UE specific $P_{O\_NOMINAL\_PUSCH\_SPS}$ and $P_{O\_UE\_PUSCH\_SPS}$ if provided by the dedicated channel (e.g. RRC). Otherwise, $P_{O\_PUSCH}$ can be defined as a PUSCH initial target power composed of the sum of a cell specific component $P_{O\_NOMINAL\_PUSCH}$ that is provided from broadcasting channel (e.g. system information block) and a UE specific component $P_{O\_UE\_PUSCH}$ provided by the dedicated channel (e.g. RRC), which can be expressed in the forms:

$$P_{O\_PUSCH}(2) = P_{O\_NOMINAL\_PUSCH\_SPS} + P_{O\_UE\_PUSCH\_SPS} \text{ or}$$

$$P_{O\_PUSCH}(2) = P_{O\_NOMINAL\_PUSCH} + P_{O\_UE\_PUSCH}$$

For the third PUSCH (Msg3) type which is corresponding to a random access response grant, $P_{O\_PUSCH}$ can be defined as a PUSCH initial target power composed of the sum of $P_{O\_PRE}$ which is the preamble initial received target power and $\Delta_{PREAMBLE\_Msg3}$ which is the Msg3 power offset over the preamble target power, which is expressed in the form of $P_{O\_PUSCH}(3) = P_{O\_PRE} + \Delta_{PREAMBLE\_Msg3}$. Both $P_{O\_PRE}$ and $\Delta_{PREAMBLE\_Msg3}$ are provided from broadcasting channel (e.g. system information block).

The random access response grant may include transmit power control TPC commands, wherein each TPC corresponds to a particular power value. Table 1 below illustrates an example set of TPC commands and associated power values.

TABLE 1

| TPC Commands | |
|---|---|
| TPC Command | Value (dB) |
| 0 | −6 |
| 1 | −4 |
| 2 | −2 |
| 3 | 0 |
| 4 | 2 |
| 5 | 4 |
| 6 | 6 |
| 7 | 8 |

Overall, PUSCH initial target power $P_{O\_PUSCH}$, PL, and $\alpha$ are open-loop parts for UL power control which can be semi-statically configured, while $\Delta_{TF}(i)$ and f(i) are closed loop parts which are updated based on dynamic assignment.

In LTE, a demodulation reference signal (DMRS) sent using a PUSCH has the same transmission power as the PUSCH itself.

Figure 2:
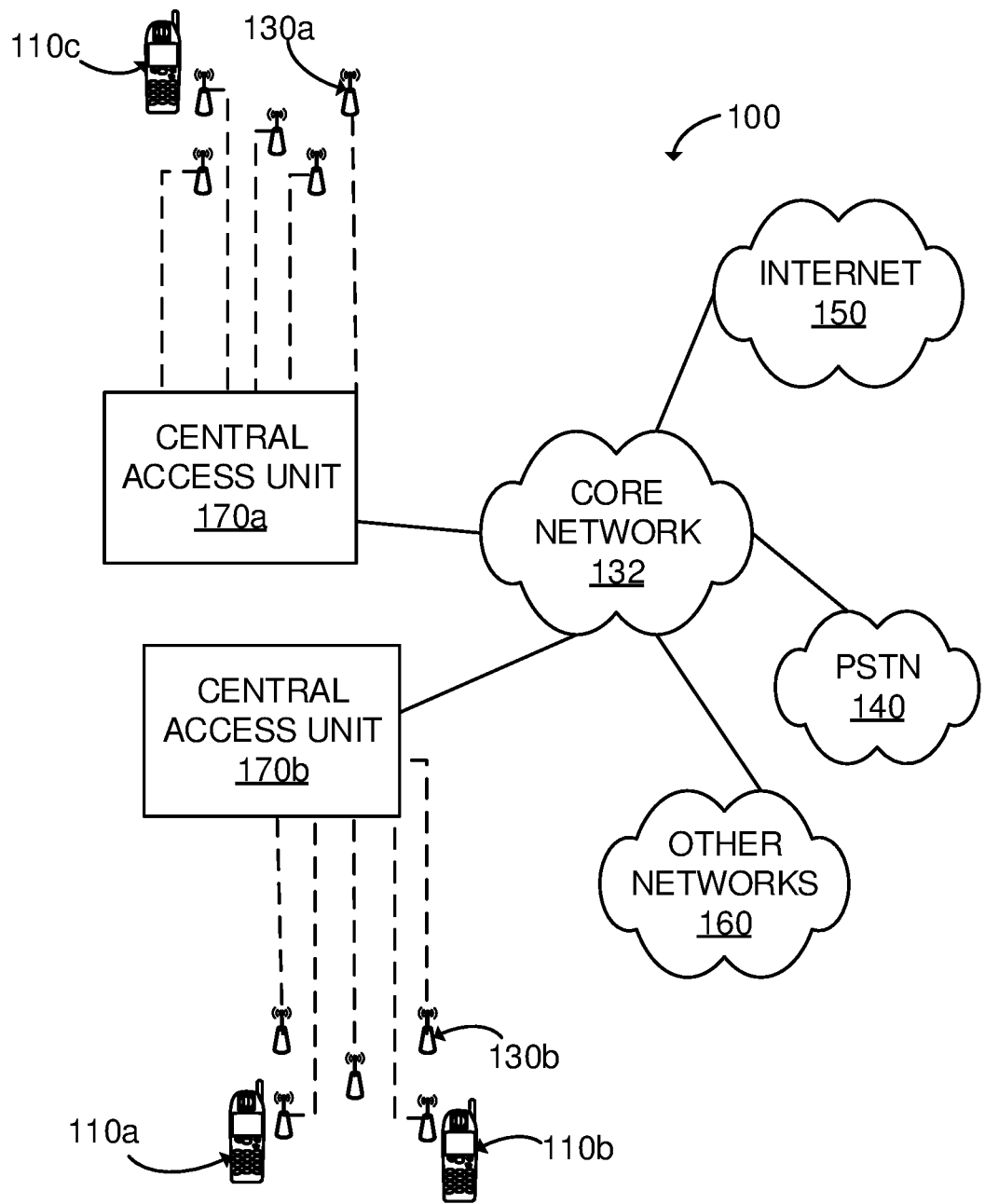
FIG. 2 illustrates an embodiment of a NR system in accordance with the present disclosure.

FIG. 2 illustrates an example NR cell communication system 100 from which NR cells may be generated. Generally, the system 100 enables multiple wireless devices to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA). Although FIG. 2 illustrates one example architecture for supporting NR cells, embodiments of the invention are not limited to this architecture. That is to say, other network architectures for supporting NR cells are also possible. For example, any network architecture where transmit/receive points in the network are controlled by one or more central access units with centralized signal processing capability can also work.

In the example of FIG. 2, NR cell communication system 100 includes user equipment (UE) 110a-110c, transmit/receive points, including transmit/receive points 130a and 130b, central access units 170a and 170b, a core network 132, a public switched telephone network (PSTN) 140, the Internet 150, and other networks 160. Note, however, that this is just an example and the NR system could have more or less transmit/receive points and/or central access units.

The UEs 110a-110c are configured to operate and/or communicate in the system 100. For example, the UEs 110a-110c are configured to transmit and/or receive wireless signals. Each UE 110a-110c represents any suitable end user device and which may also be referred to as user a wireless transmit/receive unit (WTRU), mobile station, fixed or mobile subscriber unit and may include a cellular telephone, personal digital assistant (PDA), smartphone, laptop or tablet for example.

Transmit/receive points, including transmit/receive points 130a 130b, can include, for example, mobile-relay stations, base stations, pico transmitters, or femto transmitters. The transmit/receive points can also be remote radio heads (RRHs) in some implementations. A RRH contains radio frequency circuitry plus analog-to-digital/digital-to-analog converters and up/down converters. The RRHs are located between a base station and the UEs, and are connected to a base station using optical fiber, a wireless channel or any other communication line. The RRHs receive and convert digital signals to analog, then amplify the power and send the radio frequency signals. The base stations can include a base transceiver station (BTS), a Node-B (NodeB), an evolved NodeB (eNodeB), a Home NodeB, a Home eNodeB, an access point (AP), or a wireless router.

In one arrangement, central access unit 170a can control a first group of transmit/receive points including transmit/receive point 130a while central access unit 170b can control a second group of transmit/receive points including transmit/receive point 130b. For example, a central access unit could be a gNodeB. Note, while central access units 170a and 170b are shown separate from their respective transmit/receive points, the central access units could alternatively be co-located with one or more of their respective transmit/receive points and the transmit/receive points could communicate with each other (e.g. a gNodeB could be collocated with one or more transmit/receive points and communicate with other transmit/receive points through an X2 interface). If not collocated, a central access unit could communicate with other TRP's via an optical, wireless or other connection. Central access units 170a and 170b could also communicate directly without use of core network 132.

All or a subset of transmit/receive points associated with central access units 170a may be assigned a common NR cell ID to form a NR cell. Similarly, all or a subset of transmit/receive points associated with central access unit 170b may be assigned a different common NR cell ID to form another NR cell. Alternatively, all or a subset of transmit/receive points associated with central access units 170a and 170b could be assigned a common NR cell ID. The transmit/receive points associated with central access unit 170a, 170b, and/or 170a and 170b together could also support multiple NR cells by using different subsets of transmit/receive points.

Figure 3:
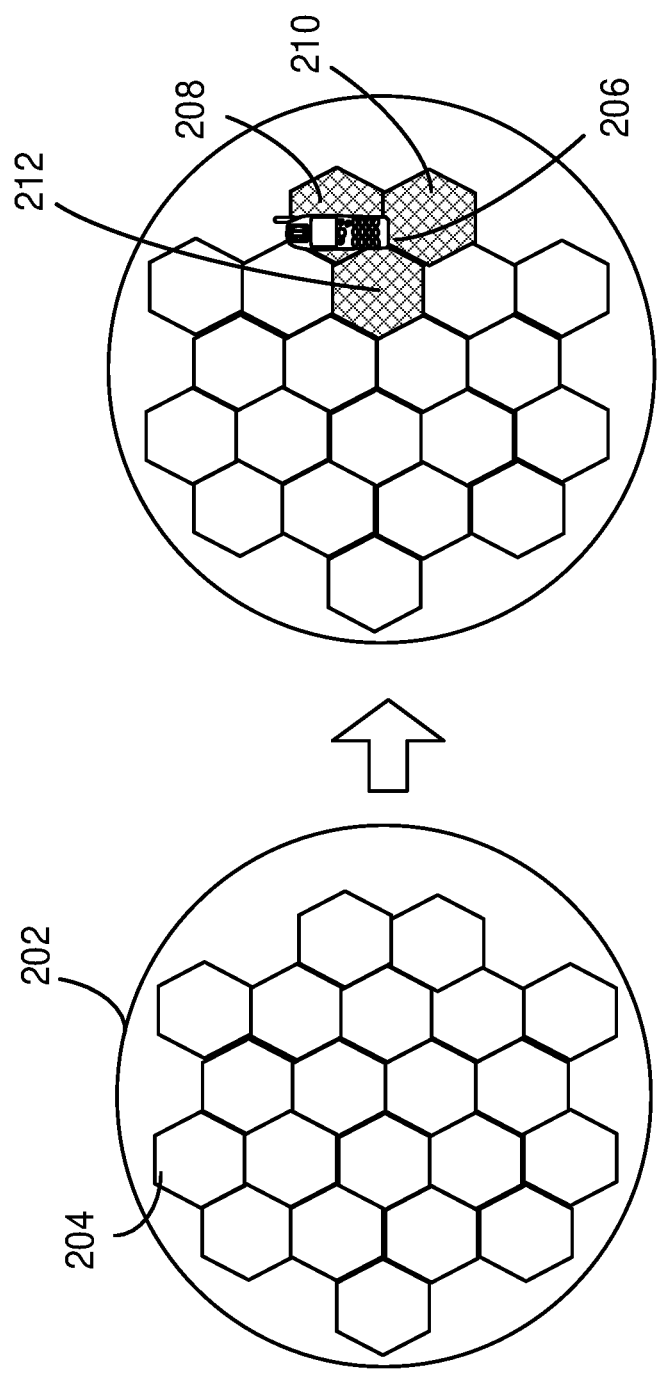
FIG. 3 illustrates another embodiment of a NR system in accordance with the present disclosure.

FIG. 3 presents a diagram illustrating an NR cell in a NR system. A NR cluster 202 includes a number of individual cells (i.e. coverage area of a transmit/receive point), such as cell 204. To create a NR cell, the system (via one or more central access units) assigns a common cell ID to all the cells (transmit/receive points) of the NR cluster that will form the NR cell. The system may create multiple NR cells within a NR cluster. Each NR cell has a unique NR cell ID that is common to and shared by all transmit/receive points associated with the respective NR cell.

FIG. 3 also illustrates exemplary optimal transmit/receive points for facilitating NR data channels and NR control channels for UE 206. For example, locations 208, 210, and 212 of three transmit/receive points are optimally situated to communicate the NR channels with UE 206. The transmit/receive points form a virtual transmit/receive point. The system can dynamically combine multiple physical transmitters and receivers to form a virtual transmit/receive point. From the perspective of a UE, the virtual transmit/receive point appears to be a single transmitter. In fact, a UE does not need to know with which transmit/receive point or set of points the UE is communicating with. The transmit/receive points used on the uplink may also differ from those used on the downlink. The system may create many virtual transmit/receive points for a NR cell and coordinate their transmissions. The system can also dynamically change the physical transmit/receive points that make up the NR cell.

Figure 4:
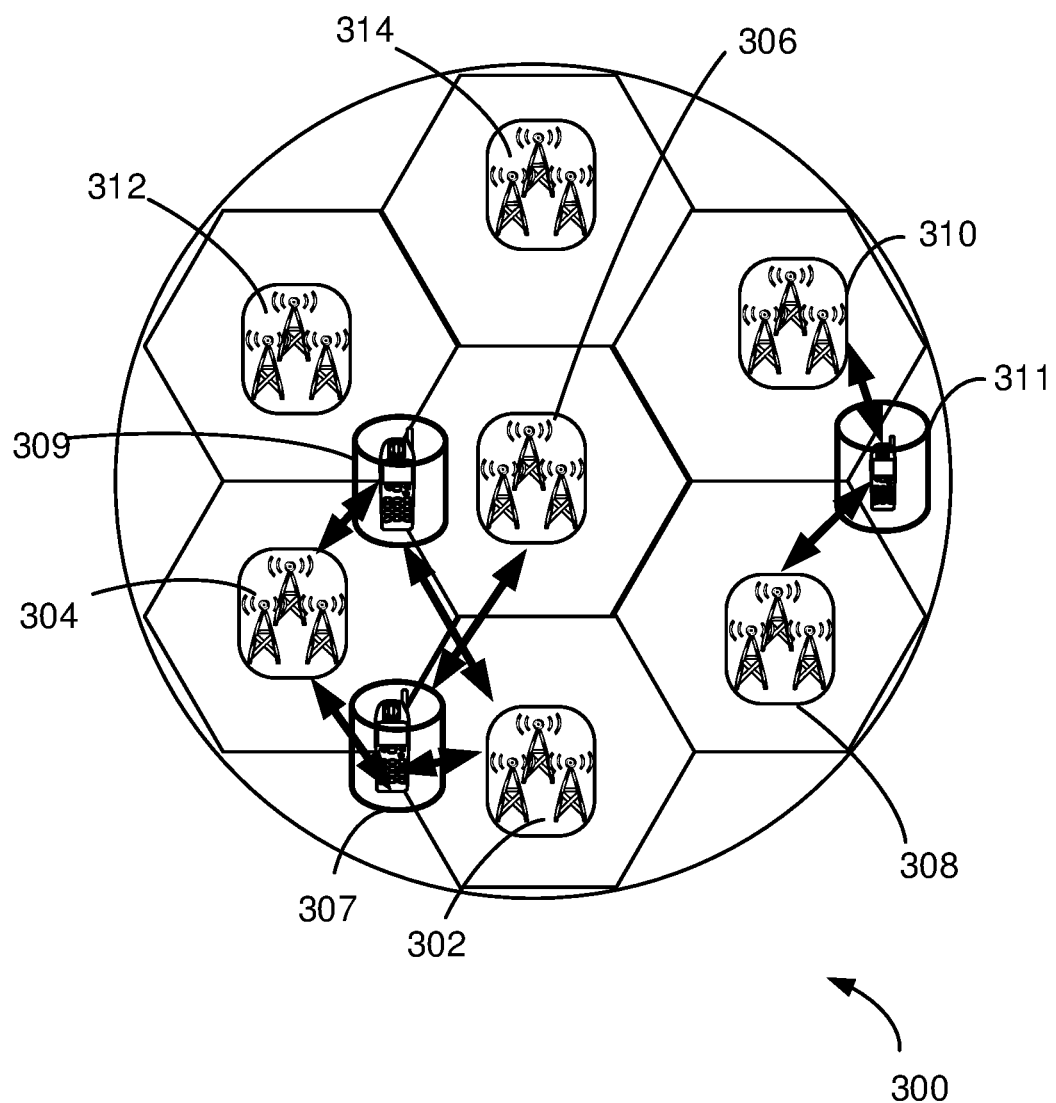
FIG. 4 illustrates another embodiment of a NR system in accordance with the present disclosure.

FIG. 4 presents a diagram of an example NR cell facilitating multiple NR channels. The system can support multiple parallel NR channels within a single NR cell, each serving a different UE. The NR cell may also utilize multiple different physical transmit/receive points or combinations of transmit/receive points to create the NR data channels. The actual physical transmit/receive points of the NR data channels are also UE-specific and are transparent to each UE. As the UEs move to different locations, the system can dynamically assign different physical transmit/receive points to service the UEs. Once again, the NR cell ID transmitted from the different physical transmit/receive points belonging to the same NR cell remains the same. As illustrated in FIG. 4, an example NR cell 300 is shown supporting three NR channels, one for each UE. Three transmit/receive points 302, 304, 306 provide a NR data channel for UE 307, two transmit/receive points 302, 304 provide a NR data channel for UE 309, and two transmit/receive points 308, 310 provide a NR data channel for UE 311. Transmit/receive points 312, 314 are silent and may be turned off to save energy. In one arrangement, a central access unit can control the generation of the NR channels based on load balancing and UE distribution within a NR cell.

Figure 5:
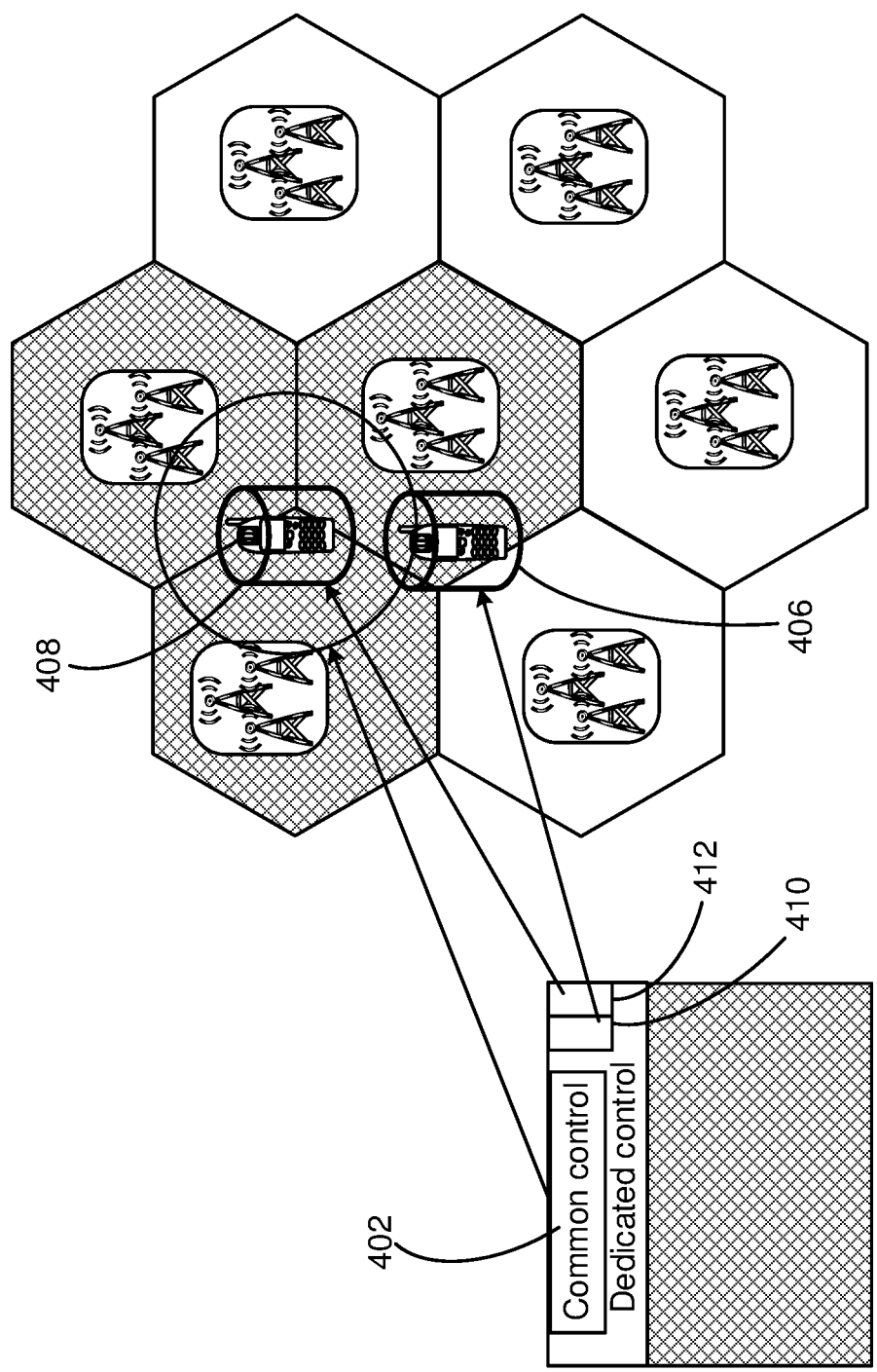
FIG. 5 illustrates another embodiment of a NR system in accordance with the present disclosure.

Set out below are examples of UL power control schemes that can be used for PUSCH transmissions in conjunction with one or more of dynamic downlink grant scheduling, semi-persistent scheduling, random access responses and grant free communications. The benefits may include one or more of:

- Having more granular uplink power settings
- Having different power setting options for sending PUSCH transmissions in different circumstances
- Having separate power settings for a DMRS transmission and a PUSCH transmission (e.g. in a grant free mode)
- Having a different PUSCH power setting with different grant types (e.g. in a grant free and dynamic grant-based mode)
- Having PUSCH-specific power settings, where multiple PUSCH transmissions are sent on different spatial resources
- Having different power settings in cases where there is beam reciprocity or not at a UE side and/or network side FIG. 5 presents a diagram illustrating a downlink (DL) control channel design which may be used in an NR system together with an example group of cells and two UEs 406,408 being served within the cells. As shown therein, each of UEs 406, 408 is served by a subset of transmit/receive points surrounding the respective UEs. The transmit/receive points transmit the UE-specific NR dedicated control channels 410, 412. Also shown is common control channel 402. NR dedicated control channel 410 is specific to UE 406, and NR dedicated control channel 412 is specific to UE 408. One or more transmission schemes of the NR data channel and/or the NR dedicated control channel, including scrambling, pilot design, and/or pilot sequence and location, are created in accordance with a UE ID. Further, a NR cell ID can be applied together with the UE ID to differentiate transmission of the NR data channel and/or NR control channel from different NR cells. Parallel NR dedicated control channels can be provided in each NR cell. The demodulation of each NR dedicated control channel is performed in accordance with a UE-specific reference signal (RS), the sequence and location of which are linked to the UE ID. To distinguish the NR dedicated control channels communicated from different NR cells, the sequence of UE-specific RS is covered by a sequence specific to each NR cell. The system may apply transmit/receive point selection techniques and transmit power control techniques to minimize intra-NR cell interference and inter-NR cell interference. For a UE with a poor Signal to Interference plus Noise Ratio (SINR), the system can transmit the NR dedicated control channel and/or NR data channel from multiple transmit/receive points to improve signal quality, including using MIMO processing. In addition, the system may apply Transmit Time Interval (TTI) bundling to a fixed or slow moving UE in order to further enhance the capacity of the UE-specific virtual dedicated control channel.

NR systems may support communications on multiple beams and may support beam specific power control; however, it remains unclear how future NR systems will handle layer power control, layer-group power control, panel specific power control, beam group specific power control and beam pair link specific power control and how to apply open loop only, closed loop only, or both open loop and closed loop power control.

For NR-PUSCH at least targeting enhanced Mobile Broadband (eMBB), open-loop power control based on a pathloss estimate may be supported. Pathloss may be estimated using DL RS for measurement. Fractional power control may also be supported, in which case, the power control method should know the DL RS(s) used for measurement (e.g. there may be multiple beamformed DL RSs). Closed-loop power control may also be supported, which is based on network signaling. Dynamic UL-power adjustment is also possible. Other implementation options for uplink power control include: beam specific power parameters with specific spatial resources; power control for other RSs and physical channels; power control for grant free PUSCH if supported and pathloss estimation.

For an UL transmission scheme without grant and RRC connection, at least a system information block may be used to support power control. On considering the impact of MCS on power control, the multiplexing structure between data and DMRS may impact the MCS/TBS. Moreover, grant-free PUSCH may have different multiplexing structure from grant-based PUSCH. The difference in the multiplexing structure between grant-free and grant based my impact the MCS and TBS.

FIGS. 6-10 illustrate signal flow diagrams in which a transmit/receive point is in communication with a UE for various embodiments of the disclosure.

Figure 6:
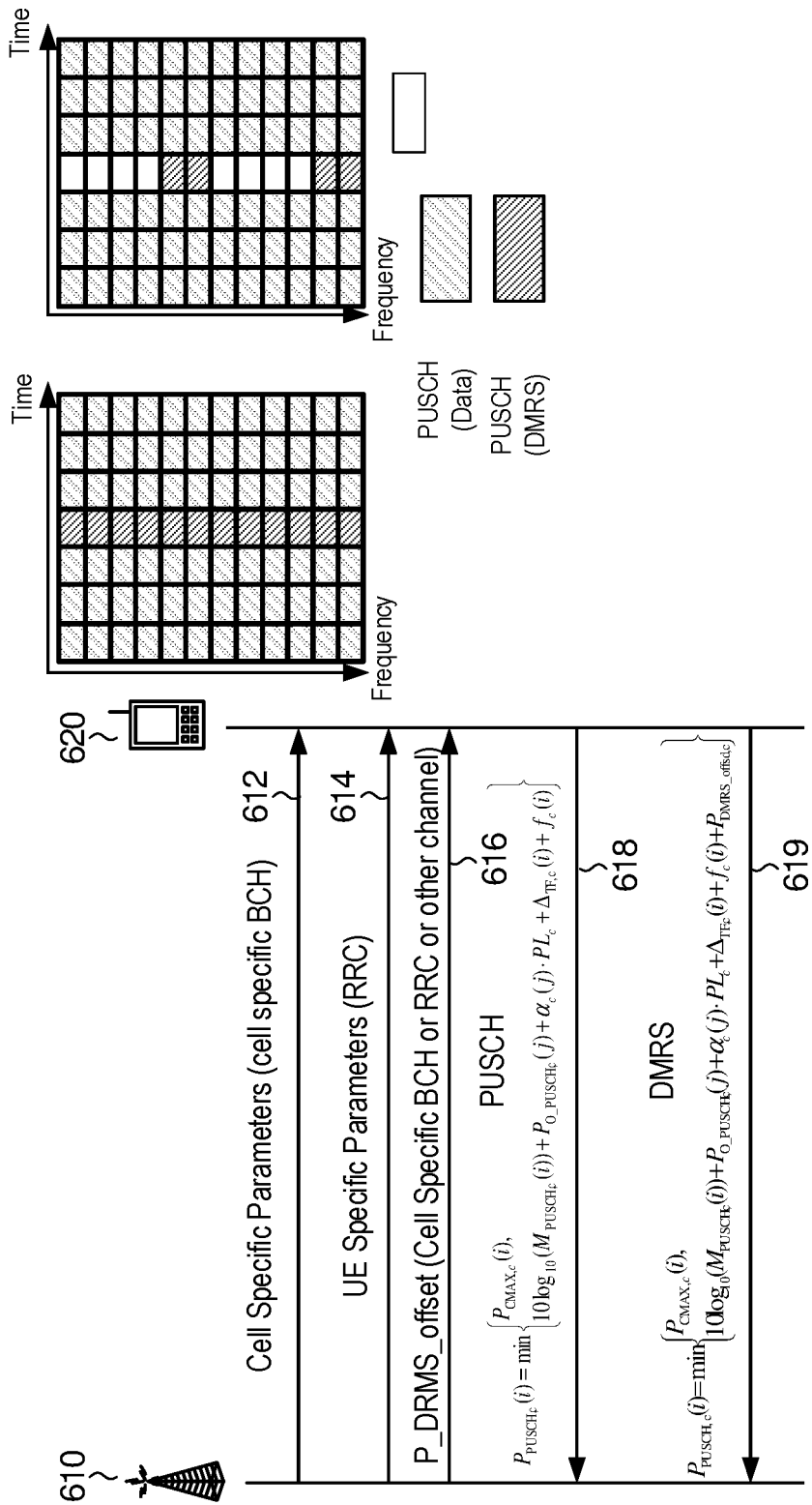
FIG. 6 illustrates an embodiment of UL power control in accordance with the present disclosure.

In one embodiment, as will be explained in the context of FIG. 6, the NR system of FIGS. 2-5 can be used to facilitate separate power control for a PUSCH and an associated DMRS. FIG. 6 illustrates a signal flow diagrams in which a transmit/receive point 610 is in communication with a UE 620. In an optional mode of operation, such separate power control can be used for grant free transmissions wherein the DMRS can be used for identifying a PUSCH transmission in addition to the channel estimation. In such cases a higher power level for DMRS than for PUSCH may be required or beneficial. Also, optionally, a new DMRS structure (e.g. FDM) which may occupy a different number of resource elements than a PUSCH within the same frequency unit (e.g. PRB) and one OFDM symbol, can be used. And in such cases the transmission power for DMRS can again be different from the transmission power for PUSCH. Specifically, as shown in FIG. 6, one or more transmit/receive points (only one 610 is shown) may transmit 614 one or more cell specific power parameters (e.g. via a Broadcast Channel which can include a physical broadcast channel (PBCH), physical hybrid-ARQ indicator channel (PHICH), physical control format indicator channel (PCFICH), physical downlink control channel (PDCCH) with common search space, physical downlink shared channel (PDSCH) with system information radio network temporary identifier (SI-RNTI), Paging RNTI (P-RNTI), etc.), and transmit 614 UE specific power parameters (e.g. via a RRC), that are received by a UE 620. The cell specific power parameters, for example, may include a first cell specific initial target PUSCH power (e.g. $P_{O\_PUSCH\_nominal}$) which is defined for PUSCH transmission with grant and/or RRC connection and a cell specific pathloss compensation factor (e.g. $\alpha$). UE specific power parameters, for example, can include a UE specific initial target PUSCH power (e.g. Po_PUSCH_UE). According to an embodiment, a DMRS power offset parameter (P_DRMS_offset), which quantifies additional power to be used for a DMRS, is sent 616 either via a cell specific broadcast channel, a dedicated channel (e.g. RRC) or another predefined channel. The DMRS power offset parameter may be explicitly signaled or may be indicated by a ratio of the resource elements used for the DMRS compared to the resource elements used for the PUSCH, for example in one PRB. The UE 620 transmits 618 a PUSCH, for example at a power level based on:

$$P_{PUSCH,c}(i,j) = \min\left\{\begin{array}{c} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\}$$

where the second entry can be written more generally as, $$P_{PUSCH}(i,j) = 10\log_{10}(M_{PUSCH}) + P_{O\_PUSCH} + \alpha \cdot PL + \Delta_{TF}(i) + f(i)$$

where, $$P_{O\_PUSCH}(1) = P_{O\_NOMINAL\_PUSCH} + P_{O\_UE\_PUSCH}$$

$$P_{O\_PUSCH}(2) = P_{O\_NOMINAL\_PUSCH\_SPS} + P_{O\_UE\_PUSCH\_SPS} \quad P_{O\_PUSCH}(2) = P_{O\_NOMINAL\_PUSCH} + P_{O\_UE\_PUSCH}$$

$$P_{O\_PUSCH}(3) = P_{O\_PRE} + \Delta_{PREAMBLE\_Msg3}$$

The UE 620 also transmits 619 a DMRS based on:

$$P_{DMRS,c}(i,j) = \min\left\{\begin{array}{c} P_{CMAX,c}(i), \\ 10\log_{10}(M_{PUSCH,c}(i)) + P_{O\_PUSCH,c}(j) + \\ P_{DMRS\_offset,c}(j) + \alpha_c(j) \cdot PL_c + \Delta_{TF,c}(i) + f_c(i) \end{array}\right\}$$

where the second entry can be written more generally as, $$P_{DMRS}(i) = 10\log_{10}(M_{PUSCH}) + P_{O\_PUSCH} + P_{DMRS\_offset} + \alpha \cdot PL + \Delta_{TF}(i) + f(i)$$

where, $$P_{O\_PUSCH}(1) = P_{O\_NOMINAL\_PUSCH} + P_{O\_UE\_PUSCH}$$

$$P_{O\_PUSCH}(2) = P_{O\_NOMINAL\_PUSCH\_SPS} + P_{O\_UE\_PUSCH\_SPS} \quad P_{O\_PUSCH}(2) = P_{O\_NOMINAL\_PUSCH} + P_{O\_UE\_PUSCH}$$

$$P_{O\_PUSCH}(3) = P_{O\_PRE} + \Delta_{PREAMBLE\_Msg3}$$

FIG. 6 also includes two examples of time-frequency resources illustrating how PUSCH data and DMRS may be scheduled for transmission. In each of the two examples, the vertical axis represents frequency, for example sub-carriers, and the horizontal axis represents time, for example symbols. A single sub-carrier of one symbol can be considered a single resource element. Each example represents a time-frequency resource of 7 symbols by 12 sub-carriers. In the first example, for all 7 symbols, of the 12 sub-carriers, the first three symbols are for data, the fourth symbol is for DMRS and the last three symbols are for data. The first example illustrates time divisional multiplexing (TDM) between the data and DMRS. In the second example, for 7 symbols, of the 12 sub-carriers, the first three symbols are for data, the fourth symbol is for DMRS and blank resource elements not used for DMRS can be used by other UEs and the last three symbols are for data. The second example illustrates TDM between the data and DMRS and frequency division multiplexing (FDM) between the DMRS and other black resource elements.

Figure 7A:
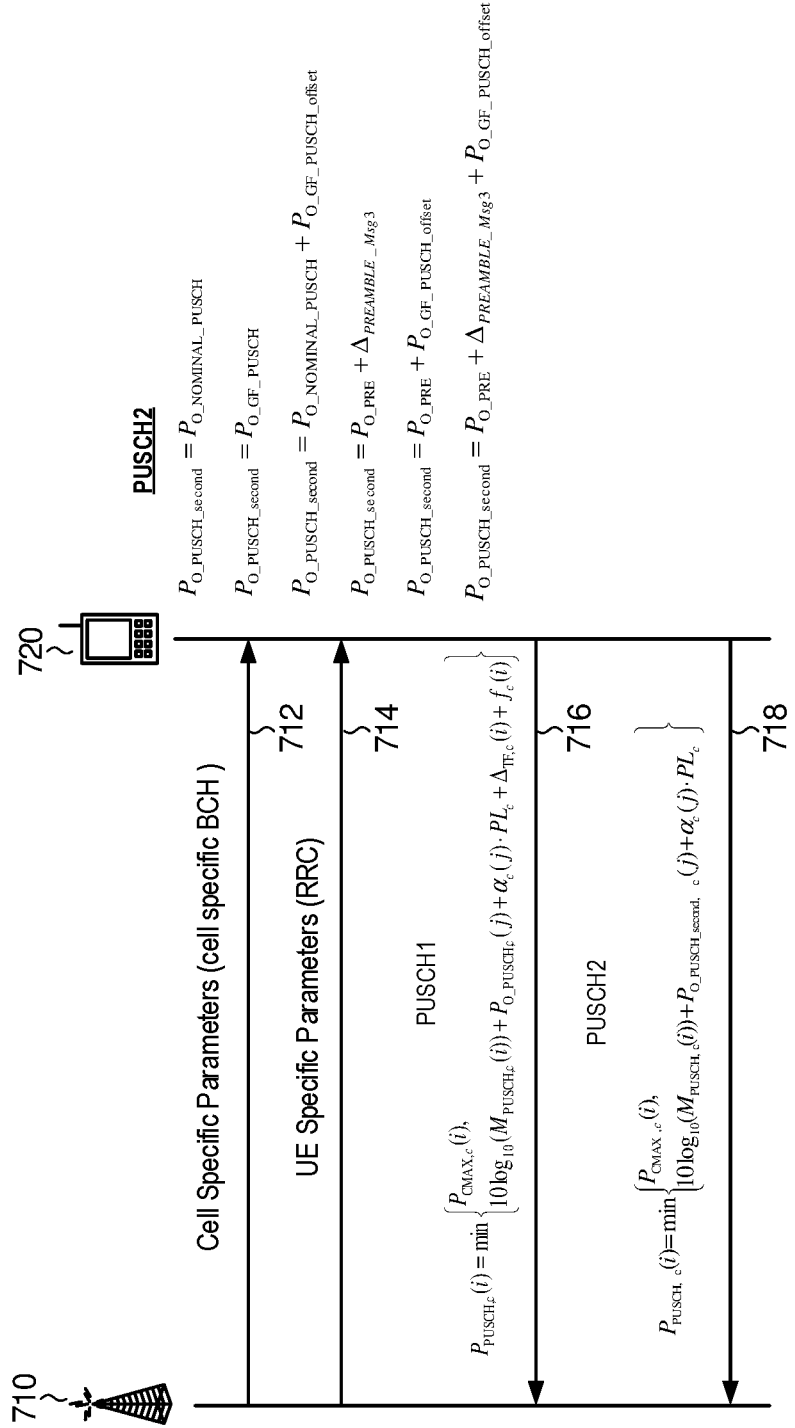
FIG. 7A illustrates another embodiment of UL power control in accordance with the present disclosure.

In another embodiment, as will be explained in the context of FIGS. 7A, 7B and 7C the NR system of FIGS. 2-5 can be used to facilitate separate power control for separate PUSCHs. Specifically, as shown in FIG. 7A, one or more transmit/receive points (only one 710 is shown) may transmit 712 one or more cell specific parameters such as initial target power (e.g. including first cell specific initial target PUSCH power $P_{o\_PUSCH\_nominal}$) and/or power offset and/or delta power parameters and/or a cell specific pathloss compensation factor (e.g. $\alpha$) to a UE 720. Depending on the state of the UE 720, the TRP 710 may also transmit 714 UE specific power parameters (e.g. including $P_{o\_PUSCH\_UE}$). Once again, these cell specific power parameters and UE specific power parameters, can be sent 712, 714 via a broadcast channel and a RRC respectively, over a PDSCH for example. Next, as shown in FIG. 7A the UE 720 transmits 716 PUSCH1, for example at an initial power level based on:

$$P_{PUSCH,c}(i, j) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

where the second entry can be written more generally as, $$P_{PUSCH}(i,j) = 10\log_{10}(M_{PUSCH}) + P_{O\_PUSCH} + \alpha \cdot PL + \Delta_{TF}(i) + f(i)$$

where, $$P_{O\_PUSCH}(1) = P_{O\_NOMINAL\_PUSCH} + P_{O\_UE\_PUSCH}$$

$$P_{O\_PUSCH}(2) = P_{O\_NOMINAL\_PUSCH\_SPS} + P_{O\_UE\_PUSCH\_SPS} \quad P_{O\_PUSCH}(2) = P_{O\_NOMINAL\_PUSCH} + P_{O\_UE\_PUSCH}$$

$$P_{O\_PUSCH}(3) = P_{O\_PRE} + \Delta_{PREAMBLE\_Msg3}$$

The UE 720 also transmits 718 another PUSCH, PUSCH2, where the power level for PUSCH2, is derived from:

$$P_{PUSCH,c}(i, j) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c \end{array} \right\}$$

$$P_{PUSCH,c}(i, j) = \min \left\{ \begin{array}{l} P_{CMAX,c}(i) \\ 10\log_{10}(M_{PUSCH,c}(i)) + P_{O\_PUSCH,c}(j) + \alpha_c(j) \cdot PL_c \end{array} \right\}$$

Where the second entry can be written more generally as, $$P_{PUSCH}(i) = 10\log_{10}(M_{PUSCH}) + P_{O\_PUSCH} + \alpha \cdot PL$$

$$P_{PUSCH,c}(i,j) = 10\log_{10}(M_{PUSCH,c}(i)) + P_{o\_PUSCH\_second,c}(j) + \alpha_c(j) \cdot PL_c$$

Where $P_{o\_PUSCH\_second}$ for PUSCH2 is one or more of:

$$P_{O\_PUSCH\_second} = P_{O\_NOMINAL\_PUSCH}$$

$$P_{O\_PUSCH\_second} = P_{O\_GF\_PUSCH}$$

$$P_{O\_PUSCH\_second} = P_{O\_NOMINAL\_PUSCH} + P_{O\_GF\_PUSCH\_offset}$$

$$P_{O\_PUSCH\_second} = P_{O\_PRE} + \Delta_{PREAMBLE\_Msg3}$$

$$P_{O\_PUSCH\_second} = P_{O\_PRE} + P_{O\_GF\_PUSCH\_offset}$$

$$P_{O\_PUSCH\_second} = P_{O\_PRE} + \Delta_{PREAMBLE\_Msg3} + P_{O\_GF\_PUSCH\_offset}$$

According to an embodiment of the disclosure, the first cell specific initial target PUSCH power parameter $P_{O\_NOMINAL\_PUSCH}$ is received on a cell specific broadcast channel and is defined for PUSCH with grant scheduling and/or RRC configuration. According to an embodiment of the disclosure the second cell specific initial target PUSCH power parameter $P_{O\_GF\_PUSCH}$, which can be used for grant free communications, also known as communication without grant, is received on a cell specific broadcast channel and is defined for PUSCH without any RRC connection (e.g. IDLE state or RRC_INACTIVE state). According to another embodiment of the disclosure, the cell specific initial target PUSCH power offset parameter $P_{O\_GF\_PUSCH\_offset}$ is received on a cell specific broadcast channel and is defined for PUSCH without any RRC connection (e.g. IDLE state or RRC_INACTIVE state). According to another embodiment of the disclosure the cell specific initial target preamble power parameter $P_{O\_PRE}$ is received on a cell specific broadcast channel and is defined for preamble. According to another embodiment of the disclosure the cell specific initial target preamble power offset parameter $\Delta_{PREAMBLE\_Msg3}$ is received on a cell specific broadcast channel and is defined for PUSCH with grant scheduling but without any RRC connection (i.e. corresponding to RAR). More generally speaking, these power parameters include one or more of a first cell specific initial target PUSCH power parameter, a second cell specific initial target PUSCH power parameter, a cell specific initial target PUSCH power offset parameter, a cell specific initial target preamble power parameter, and a cell specific initial target preamble power offset parameter, each of which may be sent over a cell specific broadcast channel. According to one embodiment PUSCH2 is sent after PUSCH1 and pursuant to a grant free transmission.

Figure 7B:
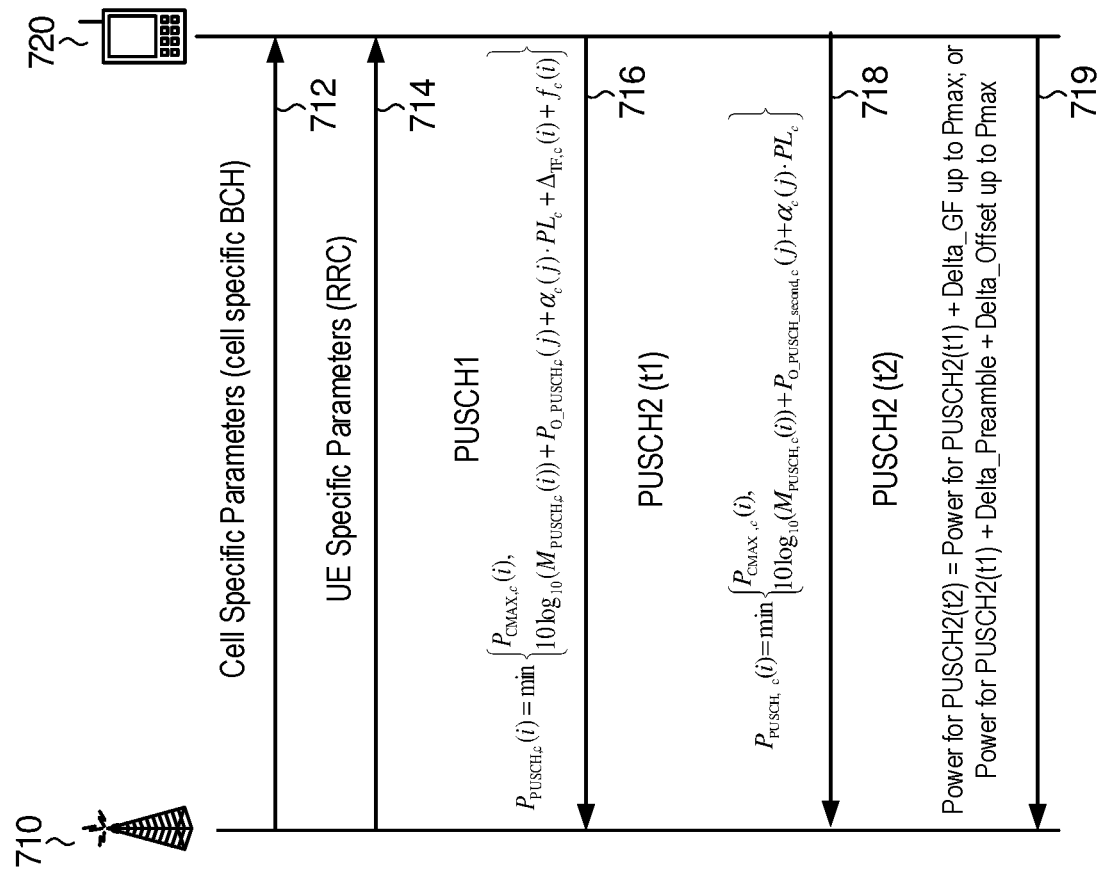
FIG. 7B illustrates another embodiment of UL power control in accordance with the present disclosure.

As shown in FIG. 7B according to another optional embodiment, the UE 720 re-transmits 719 PUSCH2 at a later time t2 with a power that is ramped up from an initial transmission 718 of PUSCH2 occurring at t1. When determining the power for this re-transmission 719, a cell specific PUSCH power delta parameter $\Delta_{GF}$, which sets out additional power to be used for PUSCH re-transmissions that is distinct from a preamble delta parameter, is received on a cell specific broadcast channel during transmission 712 and is used for retransmission of PUSCH without RRC connection (e.g. IDLE state or RRC_INACTIVE state). That being said, the cell specific PUSCH power delta parameter can be the same or a different value from the cell specific preamble power delta parameter $\Delta_{Preamble}$ which is defined for retransmission of the preamble. In one embodiment, for an Nth re-transmission of PUSCH2, the initial target PUSCH power for PUSCH2 is derived as:

$$P_{O\_PUSCH\_second,\, ReTx} = P_{O\_PUSCH\_second} + N \times \Delta_{GF}; \quad N \geq 0$$

wherein N=0 means initial transmission of PUSCH2. Alternatively, ramp up power may be defined by:

$$P_{O\_PUSCH\_second,\, ReTx} = P_{O\_PUSCH\_second} + N \times (\Delta_{GF\_offset} + \Delta_{Preamble}); \quad N \geq 0$$

Figure 7C:
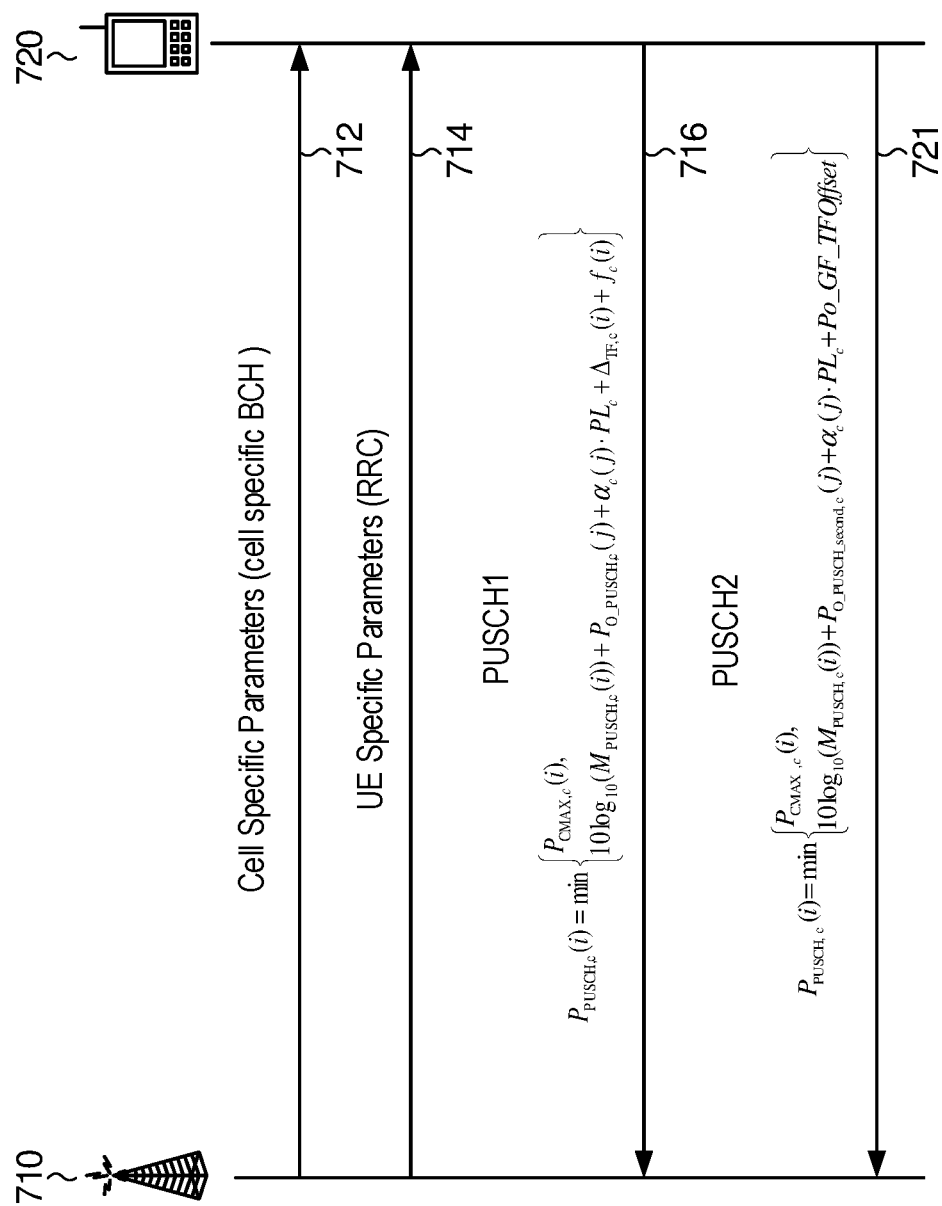
FIG. 7C illustrates another embodiment of UL power control in accordance with the present disclosure.

Also shown in FIG. 7C, according to another optional embodiment, when determining the initial target PUSCH power for transmission 721 of PUSCH2, a transmission format offset parameter $P_{O\_GF\_TFOffset}$ (i.e. $p_{o\_GF\text{-}TFOffset}$) is used. This offset parameter may be based on at least one of TBS level and/or MCS, selected based on TBS level by the UE, and a mapping table between $P_{O\_GF\_TFOffset}$ and MCS level. An example table could be as follows:

| MCS or TBS level | $P_{0\_GF\_TFOffset}$ (dBS) |
|---|---|
| 0 | 0 |
| 1 | A |
| 2 | B |

In another embodiment, as will be explained in the context of FIG. 8 the NR system of FIGS. 2-5 can be used to facilitate separate power control for separate PUSCHs transmitted on different resources (e.g. transmission beams; transmission beam pair links; panels; QCL groups; antenna ports; and transmission layers), in another optional way. A resource can be regarded as a spatial resource which is used for PUSCH transmission. Specifically, as shown in FIG. 8, one or more transmit/receive points (only one 810 is shown) may transmit 812 one or more cell specific power parameters (e.g. in a cell specific broadcast channel) and may also transmit 814 one or more UE specific power parameters (e.g. in a RRC) and that are received by UE 820. The cell specific power parameters, for example, may include first cell specific initial target PUSCH power parameter (e.g. $P_{o\_PUSCH\_nominal}$) and a cell specific pathloss compensation factor (e.g. α). The UE specific power parameters may include $P_{o\_UE\_PUSCH}$. In addition to these power parameters which can be received by the UE 820 from the network side, one power parameter pathloss can be estimated by the UE 820 based on one or more DL RS configurations. Each DL RS configuration at least includes the DL RS type definition (e.g. synchronization signal (SS) block, channel state information reference signal (CSI-RS) for DL mobility measurement, CSI-RS for DL beam management measurement) for reference signal received power (RSRP) measurement, and DL RS transmission power. One SS block includes at least one of DL synchronization channel, DMRS for PBCH. These cell specific parameters, UE specific parameters and one estimated pathloss can be arranged as a first parameter set which are common for multiple separate PUSCHs (e.g. PUSCH1 and PUSCH2) transmitted on different resources, such as different spatial resources associated with different resource indices. In the case of the first PUSCH type, scheduled with a dynamic grant (GRANT), the first cell specific initial target PUSCH power parameter (e.g. $P_{o\_PUSCH\_nominal}$) can be common for different PUSCH with different resource index. In the case of the second PUSCH type, semi-persistently scheduled with a dynamic grant (SPS), the UE specific power parameter $P_{o\_PUSCH\_UE}$ can be common for different PUSCH with different resource indices. In the case of the third PUSCH type, the random access response grant (MSG3), one estimated pathloss can be common for different PUSCH with different resource indices. As shown in FIG. 8, the network side also transmits 815 one or more respective PUSCH specific power parameters for multiple PUSCH channels (e.g. PUSCH1 and PUSCH2). These PUSCH specific power parameters can include one or more of the following: PUSCH specific initial target PUSCH power (i.e. a $P_{o\_UE\_PUSCH}$ parameter that is now specific to a particular PUSCH instead of the UE as a whole) which can be configured with RRC separately for each PUSCH or using an offset for one PUSCH relative to another; and PUSCH specific close-loop factors based on TPC f(i) and/or transmission format TF(i) based on downlink control information (DCI) indication. In addition to these respective PUSCH specific power parameters which can be received by the UE 820 from the network side, respective PUSCH specific pathloss can be estimated by the UE 820 based on one or more DL RS configurations. Each DL RS configuration at least includes the DL RS type definition (e.g. SS block, CSI-RS for DL mobility measurement, CSI-RS for DL beam management measurement) for RSRP measurement, DL RS transmission power and the associated PUSCH specific resource index. Based on DL RS configurations associated with a specific resource index, the UE 820 can estimate PUSCH specific pathloss. The UE 820 then sends 816, 818 PUSCH1 and PUSCH2 with a respective power that is a function of one or more of the cell specific power parameters, the UE specific power parameters, and the respective PUSCH specific power parameters. Specifically, the respective PUSCH specific power parameters are used in place of cell specific power parameters and UE specific power parameters, for example using the following:

PUSCH1

$$P_{PUSCH,c}(i, j) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

PUSCH2

$$P_{PUSCH,c}(i, j) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

where:

$P_{O\_PUSCH}(1) = P_{O\_NOMINAL\_PUSCH} + P_{O\_UE\_PUSCH}$ $P_{O\_PUSCH}(2) = P_{O\_NOMINAL\_PUSCH\_SPS} + P_{O\_UE\_PUSCH\_SPS}$  $P_{O\_PUSCH}(2) = P_{O\_NOMINAL\_PUSCH} + P_{O\_UE\_PUSCH}$ $P_{O\_PUSCH}(3) = P_{O\_PRE} + \Delta_{PREAMBLE\_Msg3}$ Generally, for PUSCH power control, the UE can be configured with multiple J (j=0, 1, ... J−1) UE-specific $P_{o\_UE\_PUSCH}$ and one cell-specific $P_{o\_nominal}$, K (k=0, 1, ... K−1) pathloss with specific RS resource configuration, N(=2) close-loop TPC f(l) (l=0,N−1) and $N_{SRS}$ SRS resource indicator (SRI) configurations. For one specific PUSCH with specific {j,k,l} values, the UE can determine the specific j/k/l values based on a mapping between the SRI to J, the SRI to K and the SRI to N (as l is dependent upon N). For specific PUSCH with specific SRI, j can be different from other specific PUSCH or common to other specific PUSCH, k can be different other specific PUSCH or common other specific PUSCH and l can be different other specific PUSCH or common other specific PUSCH.

For example:

$$P_{PUSCH}(i) = 10\log_{10}(M_{PUSCH}) + P_{O\_PUSCH} + \alpha \cdot PL + \Delta_{TF}(i) + f(i)$$

can be replaced with UE specific and PUSCH specific transmission power as:

$$P_{PUSCH(m)}(i) = 10\log_{10}(M_{PUSCH(m)}) + P_{O\_PUSCH} + \alpha \cdot PL + \Delta_{TF(m)}(i) + f_{(m)}(i)$$

wherein only close-loop factors based on TPC $f_{(m)}(i)$ and/or transmission format $\Delta_{TF(m)}(i)$ are PUSCH specific based on specific DL assignment wherein m is spatial resource index or $$P_{PUSCH(m)}(i) = 10\log_{10}(M_{PUSCH(m)}) + P_{O\_PUSCH(m)} + \alpha \cdot PL + \Delta_{TF(m)}(i) + f_{(m)}(i)$$

wherein $P_{O\_PUSCH(m)} = P_{O\_PUSCH\_nominal} + P_{O\_PUSCH\_UE(m)}$ i.e. PUSCH specific initial target power and common $P_{O\_PUSCCH\_nominal}$, is additionally used.
or $$P_{PUSCH(m)}(i) = 10\log_{10}(M_{PUSCH(m)}) + P_{O\_PUSCH(m)} + \alpha \cdot PL_{(m)} + \Delta_{TF(m)}(i) + f_{(m)}(i)$$

wherein PUSCH specific PL could be additionally used.

In a NR system, RSRP(s) can be measured from the IDLE mode RS. One RSRP value is measured from the IDLE mode RS per SS block. The UE may measure one or more RSRP value from multiple SS blocks in an SS burst set and the measured values are referred to as "SS-block-RSRP". Consequently, for the high frequency transmission scenarios with multiple Tx/Rx beams at the network side and multiple Tx/Rx beams at the UE side, the UE may have multiple pathloss estimation based on multiple SS blocks and/or CSI-RS which is also configured for the mobility measurement during RRC connective state. In addition, Tx/Rx reciprocity at the network side and/or UE side, may impact the downlink pathloss measurement which will be used for the power control for the uplink channel/signal transmission (e.g. physical random access channel (PRACH) and/or PUSCH, and/or PUCCH and reference signals).

Figure 9:
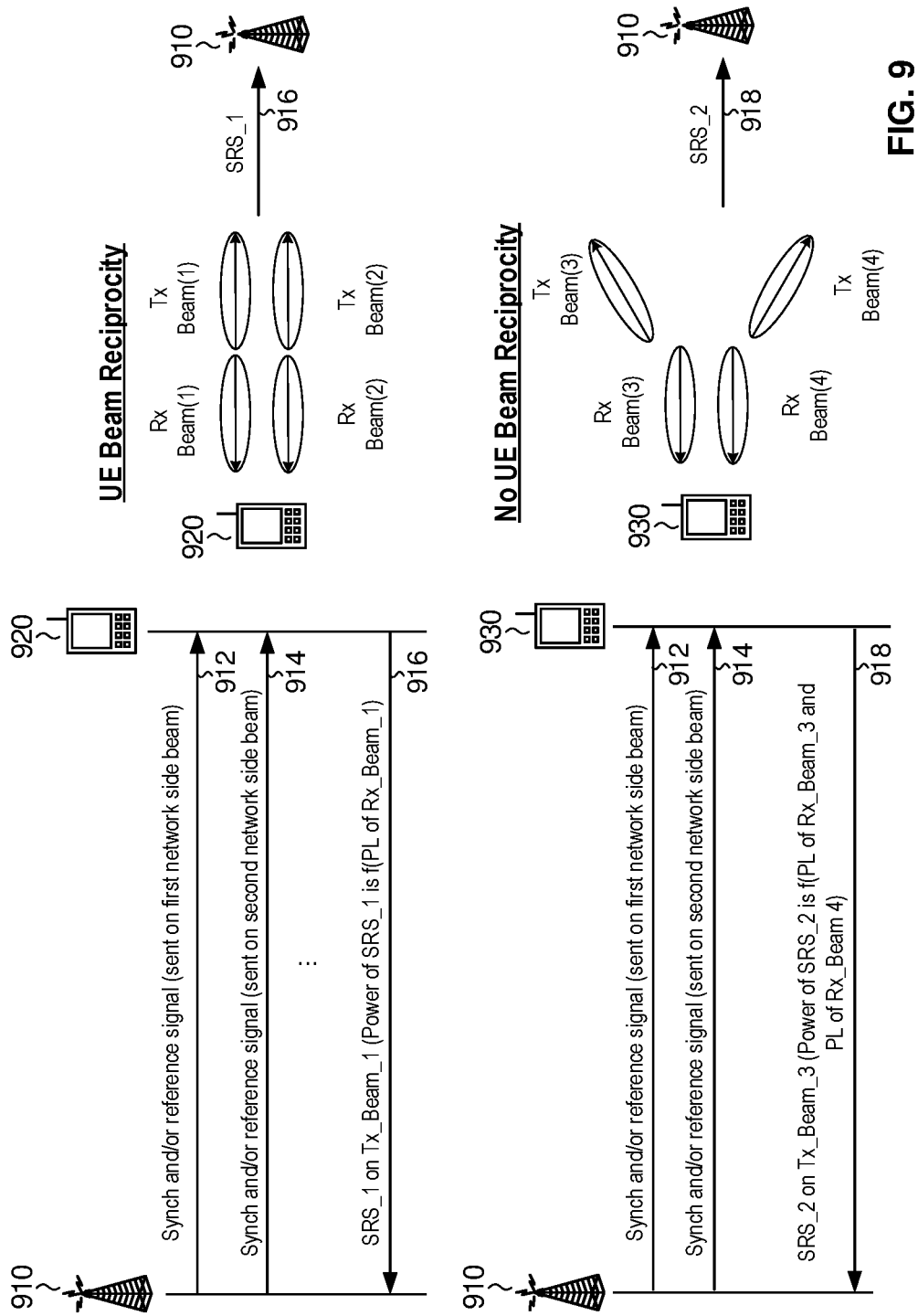
FIG. 9 illustrates another embodiment of UL power control in accordance with the present disclosure.

In another embodiment, as will be explained in the context of FIG. 9, the NR system of FIGS. 2-5 can be used for UL power control in circumstances when a UE 920 has transmit/receive beam reciprocity (where there is an association or relationship between transmit beams and receive beams), and when a UE 930 does not. As shown in FIG. 9, one or more synchronization and/or reference signals 912, 914 (i.e. SS block) associated with one or more transmit beams of one or more transmit/receive points (only one 910 shown) can be sent to a UE 920, 930. As shown in FIG. 9, in the situation where the UE 920 does have beam reciprocity between a UE transmit beam and a UE receive beam, the UE 920 transmits 916 a channel and/or signal (e.g. an SRS_1) using a first beam (e.g. Tx Beam (1)) using a power control process involving a pathloss value derived from at least one RSRP associated with an associated receive beam (PL associated with Rx_Beam_1) as the first transmit beam, to transmit 916 the transmission at a given power level (Power of SRS_1). An associated receive beam can be a receive beam having the same index as the transmit beam. Alternatively, as is also shown in FIG. 9, in the situation where a UE 930 does not have beam reciprocity between a UE transmit beam and a UE receive beam, the UE transmits 918 a channel and/or signal (e.g. an SRS_2) using the first beam (Tx Beam (1)) and using a power control process involving an average pathloss value derived from at least one RSRP associated with a set of receive beams (e.g. Rx Beam (3) and Rx Beam (4)), to transmit 918 the transmission at a given power level (Power of SRS_2).

Figure 10:
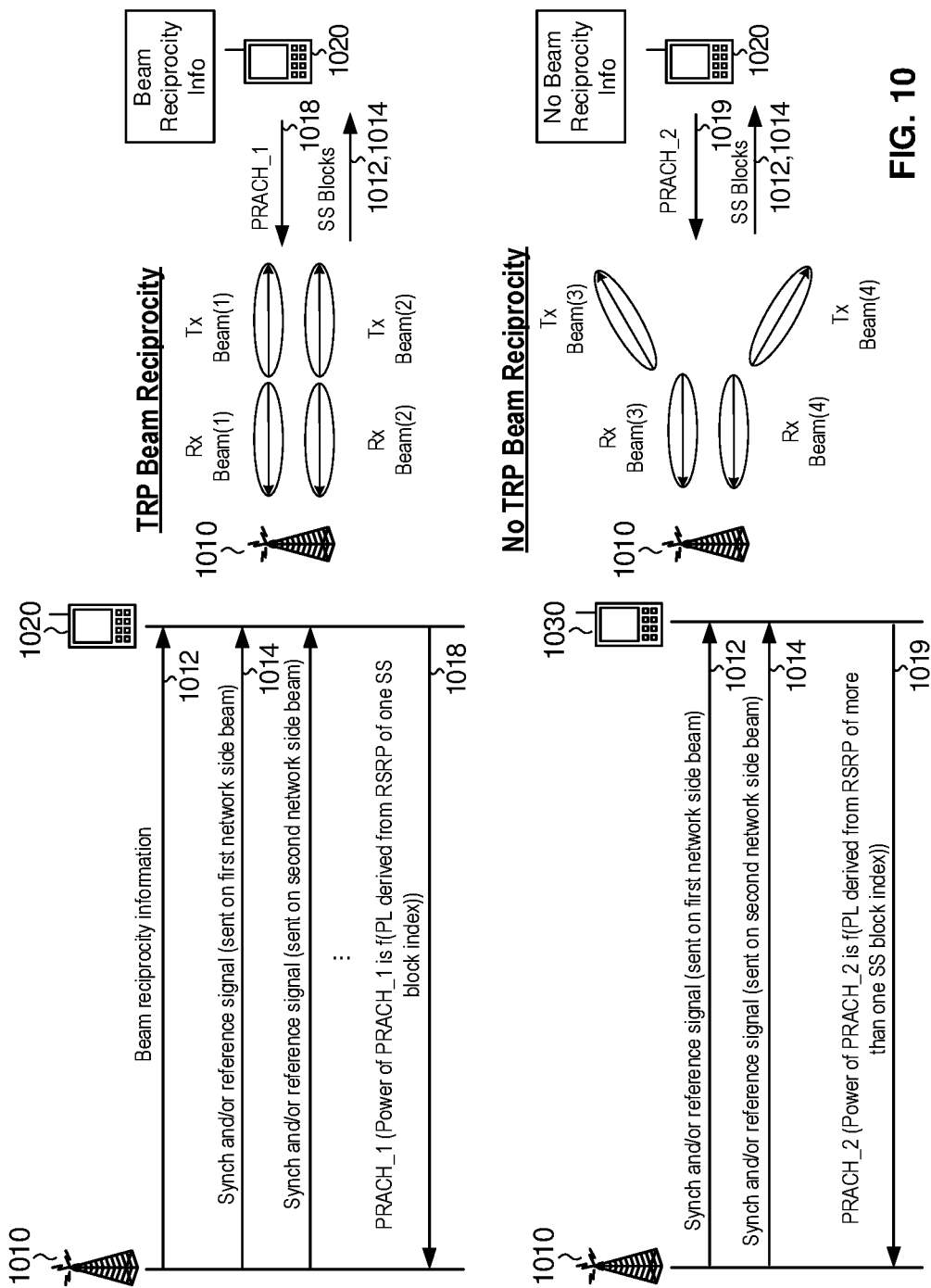
FIG. 10 illustrates another embodiment of UL power control in accordance with the present disclosure.

In another embodiment, as will be explained in the context of FIG. 10, the NR system of FIGS. 2-5 can be used for UL power control in circumstances when a network side has transmit/receive beam reciprocity, and when a network side does not have transmit/receive beam reciprocity. As shown in FIG. 10, in the situation where the network side, for example a transmit/receive point 1010 has beam reciprocity between one or more transmit beams and a receive beam, the UE 1020 transmits uplink channel and/or signal (e.g. a PRACH_1 transmission) using a power control process involving a pathloss value derived from at least one RSRP associated with one SS block 1012, 1014 and/or network side beam index to transmit 1018 the UL channel and/or signal at a given power level (Power of PRACH_1). An SS block 1012, 1014 can include one or more synchronization signals and system information (e.g. in a physical broadcast channel). Alternatively, as is also shown in FIG. 10, in the situation where a network side, i.e. TRP 1010, does not have beam reciprocity between a transmit beam and a receive beam, the UE 1020 transmits (e.g. a PRACH_2 transmission) using a power control process involving a pathloss value derived from multiple RSRP(s) associated with more than one SS block 1012, 1014 and/or network side transmission beam index, to transmit 1019 the transmission at a given power level (Power of PRACH_2). Moreover at least one indication for transmit/receive beam reciprocity at the network side is provided to the UE 1020, for example, via a broadcasting channel.

Figure 11A:
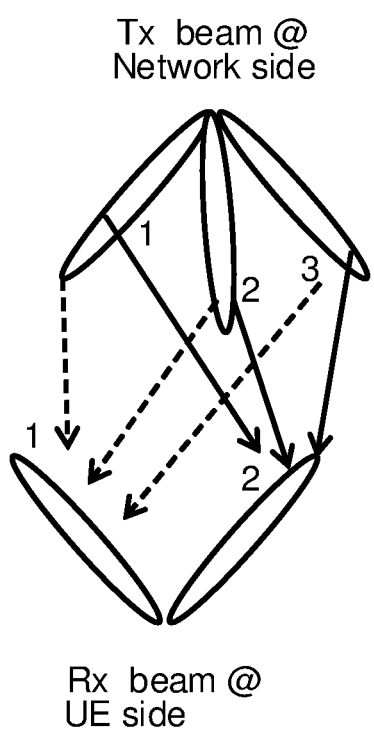
FIGS. 11A and 11B illustrate examples of network side and UE side transmission and receiving for multiple beam communication.
Figure 11B:
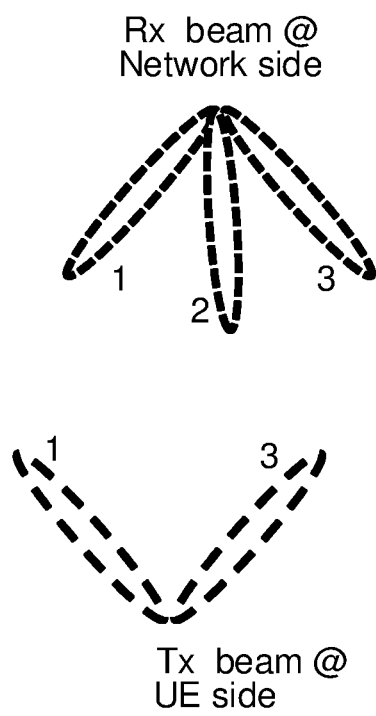

FIGS. 11A and 11B illustrate examples of network side and UE side transmission and receiving for multiple beam communication. FIG. 11A illustrates an example with three transmission beams 1, 2, 3 on the network side and two receive beams 1, 2 on the UE side. FIG. 11B illustrates an example with three receive beams 1, 2, 3 on the network side and two transmit beams 1, 2 on the UE side. With respect to beam reciprocity, the UE can measure the reference signal received power (RSRP) based on beam pair links 11, 21, 31, 12, 22 and 32. If there is reciprocity both @ UE side and @Network side, if Tx beam 1 @ UE and Rx beam 2 @ Network side used, then only RSRP of link 11 is used to derive PL. If there is reciprocity @ UE side, but not @Network side, if Tx beam 1 @ UE side and any Rx beam @ Network side is used, then 3 RSRP of link 11, 21, 31 are used to derive PL (average). If there is no reciprocity @ UE side and Network side, if any Tx beam @ UE side and any Rx beam @ Network side is used, then 3×2 RSRP of link 11, 21, 31, 12, 22, 32 are used to derive PL (average). The UE can measure RSRP based on beam pair link 11, 21, 31, 12, 22, 32

Figure 12:
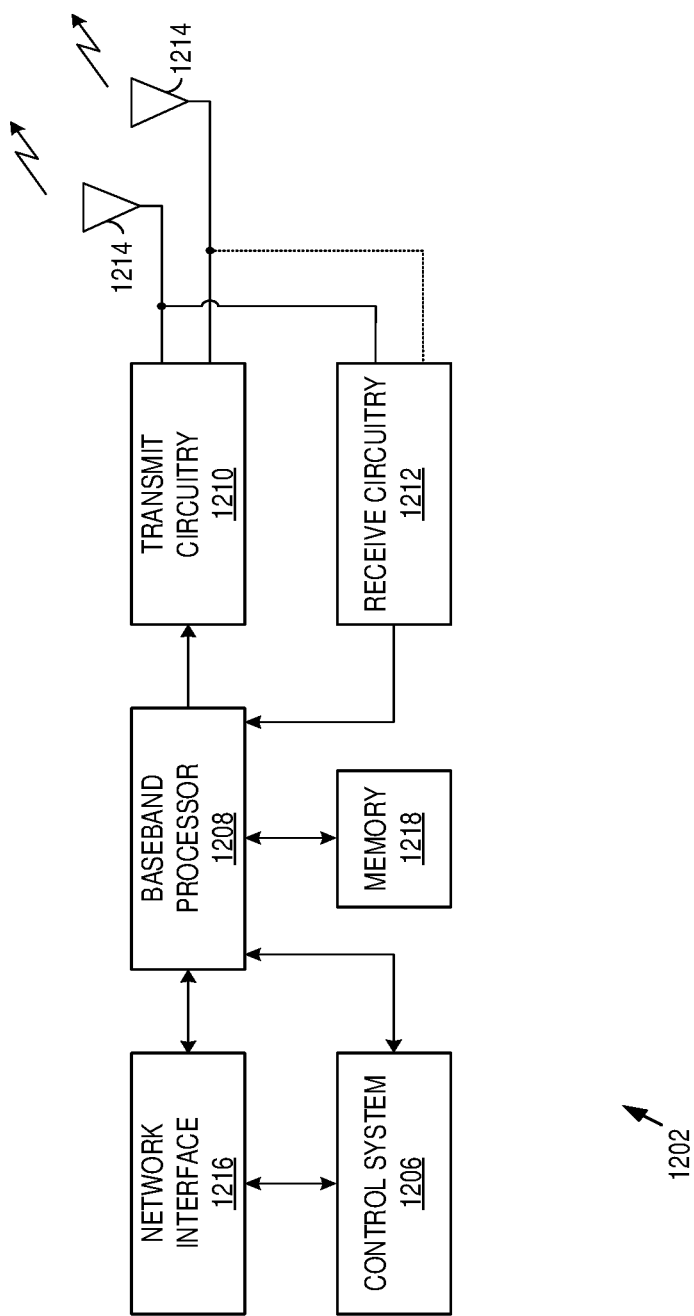
FIG. 12 illustrates a block diagram representation of a NR transmit/receive point in accordance with the present disclosure.

FIG. 12 illustrates a block diagram representation of a NR transmit/receive point in accordance with an embodiment of the present disclosure. A high-level description of a transmit/receive point 1102 that can be used in the NR system described above is illustrated. The transmit/receive point 1102 generally includes a control system 1106, a baseband processor 1108, memory 1118, transmit circuitry 1110, receive circuitry 1112, multiple antennas 1114, and interfaces 1116 which can include network interfaces including an X2 interface. The memory 1118 may be any type of memory capable of storing software and data. The receive circuitry 1112 receives radio frequency signals bearing information from one or more remote UE's as will be described in conjunction with FIG. 13. Preferably, a low noise amplifier and a filter (not shown) cooperate to amplify and remove broadband interference from the signal for processing. down-conversion and digitization circuitry (not shown) will then downconvert the filtered, received signal to an intermediate or baseband frequency signal, which is then digitized into one or more digital streams.

The baseband processor 1108 processes the digitized received signal to extract the information or data bits conveyed in the received signal. This processing typically comprises demodulation, decoding, and error correction operations. As such, the baseband processor 1108 is generally implemented in one or more DSPs or application-specific integrated circuits (ASICs). The received information is then sent to an associated network via the network interface 1116 or transmitted to another mobile terminal 1104 serviced by the base station 1102. Amongst other things baseband processor 1108 can perform channel estimation as describe above.

On the transmit side, the baseband processor 1108 receives digitized data, which may represent voice, data, or control information, from the network interface 1116 under the control of the control system 1106, and encodes the data for transmission. The encoded data is output to the transmit circuitry 1110, where it is modulated by a carrier signal having a desired transmit frequency or frequencies. A power amplifier (not shown) will amplify the modulated carrier signal to a level appropriate for transmission, and deliver the modulated carrier signal to the antennas 1114 through a matching network (not shown). Modulation and processing details are described in greater detail below. In one embodiment of the present disclosure, the base station 1102 transmits signals using both antennas 1114, but receives signals using a single antenna 1114.

With respect to the central access units describe earlier, a similar architecture to that for a transmit/receive point in FIG. 12 could be used but with different interfaces and transmit/receive circuitry. For example, the transmit/receive circuitry may be for optical, DSL or any other communication scheme. If collocated with a transmit/receive point, a central access unit could reuse the baseband processor and other components of the transmit/receive point as necessary (e.g. interfaces for communicating with other transmit/receive points).

Figure 13:
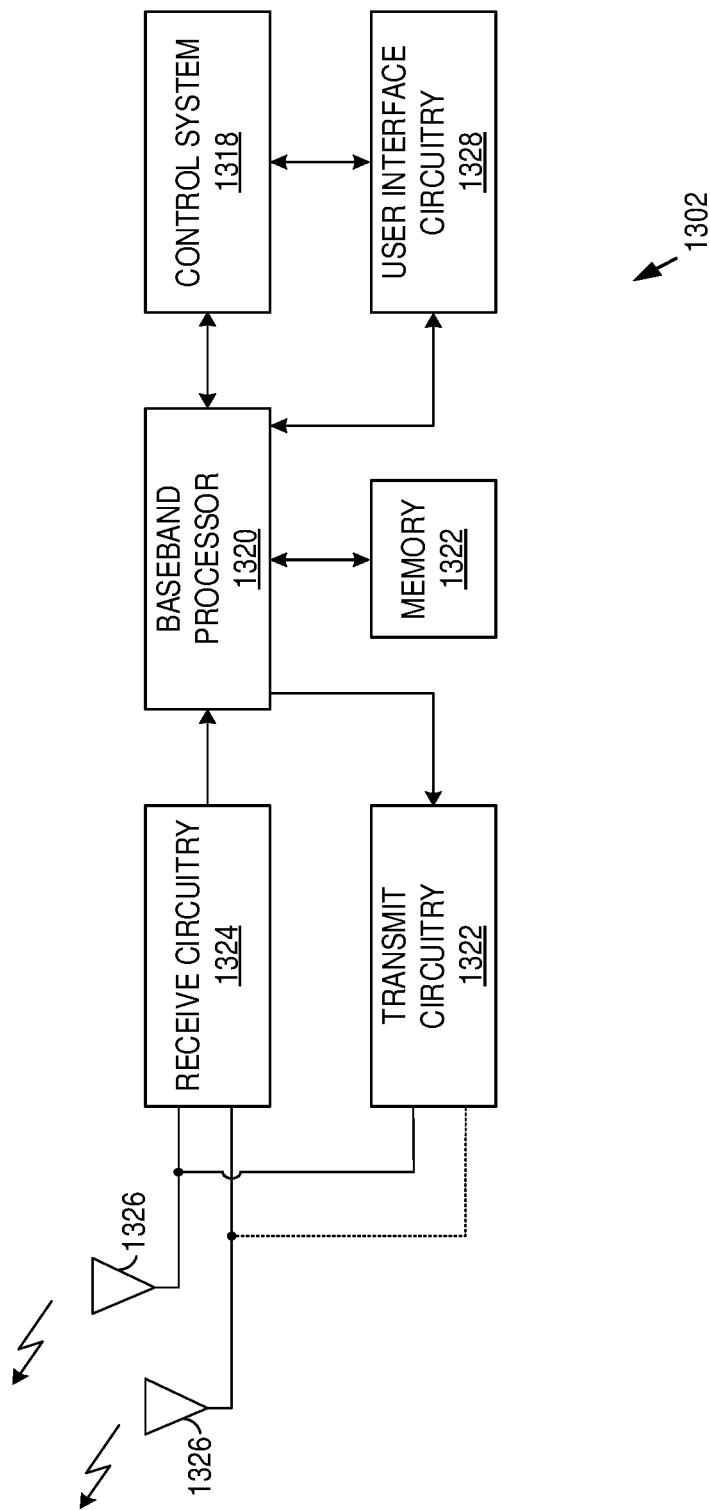
FIG. 13 illustrates a block diagram representation of a NR UE in accordance with the present disclosure.

FIG. 13 illustrates a block diagram representation of a NR UE in accordance with an embodiment of the present disclosure. A high-level description of the components of UE 1202 is shown. Similarly, to the transmit/receive point 1102, the UE 1202 will include a control system 1218, a baseband processor 1220, memory 1222, transmit circuitry 1222, receive circuitry 1224, multiple antennas 1226, and user interface circuitry 1228. The receive circuitry 1224 receives radio frequency signals bearing information from one or more base stations 1202. Preferably, a low noise amplifier and a filter (not shown) cooperate to amplify and remove broadband interference from the signal for processing. Down conversion and digitization circuitry (not shown) will then down convert the filtered, received signal to an intermediate or baseband frequency signal, which is then digitized into one or more digital streams.

The baseband processor 1220 processes the digitized received signal to extract the information or data bits conveyed in the received signal. This processing typically comprises demodulation, decoding, and error correction operations, as will be discussed in greater detail below. The baseband processor 1220 is generally implemented in one or more DSP, ASIC, or both.

For transmission, the baseband processor 1220 receives digitized data, which may represent voice, data, or control information, from the control system 1218 or the interface circuitry 1228, which it encodes for transmission. The encoded data is output to the transmit circuitry 1222, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 1226 through a matching network (not shown). The UE 1204 may receive signals using both antennas 1226, but transmits signals using a single antenna 1226. Various modulation and processing techniques available to those skilled in the art are applicable. Amongst other things, baseband processor 1220 can generate SRSs as described above. Specifically, baseband processor 1220 can generate SRSs based on configuration information received from the network.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation may require the performance of an Inverse Discrete Fourier Transform (IDFT) on the information to be transmitted. For demodulation, the performance of a Discrete Fourier Transform (DFT) on the received signal is required to recover the transmitted information. In practice, the IDFT and DFT may be provided by digital signal processing carrying out an Inverse Fast Fourier Transform (IFFT) and Fast Fourier Transform (FFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

Single Carrier FDMA (SC-FDMA) modulation differs from OFDM modulation in that SC-FDMA uses a DFT block before mapping symbols to sub-carriers and that it uses a parallel-to-serial unit after the IFDT block. Otherwise SC-FDMA modulation is otherwise similar to OFDM modulation.

OFDM is used for at least the downlink transmission from the base stations 1102 to the mobile terminals 1204. Each base station 1102 is equipped with n transmit antennas 1114, and each mobile terminal 1204 is equipped with m receive antennas 1226. Notably, the respective antennas can be used for reception and transmission using appropriate duplexers or switches and are so labeled only for clarity.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," "baseband processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the disclosure. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

According to a first example, there is provided a method comprising: determining a first initial target power level for transmitting a physical uplink shared channel; transmitting the physical uplink shared channel at the first initial target power level; determining a second initial target power level for transmitting a demodulation reference signal based on the first initial target power level and an offset parameter; and transmitting the demodulation reference signal at the second initial target power level; and wherein the demodulation reference signal is associated with the physical uplink shared channel.

In some embodiments of the first example, the physical uplink shared channel is scheduled with a dynamic downlink grant.

In some embodiments of the first example, the physical uplink shared channel is semi-persistently scheduled.

In some embodiments of the first example, the physical uplink shared channel is corresponding to a random access response.

In some embodiments of the first example, the physical uplink shared channel is transmitted pursuant to a grant free communication.

In some embodiments of the first example, the demodulation reference signal is scheduled with a dynamic downlink grant.

In some embodiments of the first example, the demodulation reference signal is semi-persistently scheduled.

In some embodiments of the first example, the demodulation reference signal is corresponding to a random access response.

In some embodiments of the first example, the demodulation reference signal is transmitted pursuant to a grant free communication.

In some embodiments of the first example, the offset is received on one of a broadcast channel, dedicated control channel or other predefined channel.

In some embodiments of the first example, the demodulation reference signal uses a first number of resource elements and the physical uplink shared channel uses a second number of resource elements the method further comprising, deriving the offset parameter from the ratio of the first number of resource elements and the second number of resource elements.

In some embodiments of the first example, the method further comprises receiving the offset parameter that has been explicitly signaled.

According to a second example, there is provided a method comprising: transmitting a first set of power parameters for provisioning a physical uplink shared channel and a demodulation reference signal to be sent with the physical uplink shared channel; transmitting a second power offset parameter for provisioning the demodulation reference signal; and receiving the physical uplink shared channel and the demodulation reference signal.

In some embodiments of second example, the method further comprises scheduling the physical uplink shared channel with a dynamic downlink grant.

In some embodiments of the second example, the method further comprises semi-persistently scheduling the physical uplink shared channel.

In some embodiments of the second example, the physical uplink shared channel is received in response to a random access response.

In some embodiments of the second example, the method further comprises the physical uplink shared channel is received pursuant to a grant free communication.

In some embodiments of the second example, the method further comprises scheduling the demodulation reference signal with a dynamic downlink grant.

In some embodiments of the second example, the method further comprises semi-persistently scheduling the demodulation reference signal.

In some embodiments of the second example, the demodulation reference signal is received in response to a random access response.

In some embodiments of the second example, the demodulation reference signal is received pursuant to a grant free communication.

In some embodiments of second example, the offset is transmitted on one of a broadcast channel, dedicated control channel or other predefined channel.

In some embodiments of the second example, the method further comprises provisioning the demodulation reference signal such that it uses a first number of resource elements and provisioning the physical uplink shared channel such that it uses a second number of resource elements wherein the first number is different from the second number.

According to a third example, there is provided a method comprising: determining a first initial target power level for transmitting a first physical uplink shared channel; transmitting the first physical uplink shared channel at the first initial target power level; determining a second initial target power level for transmitting a second physical uplink shared channel; transmitting the second physical uplink shared channel at the second initial target power level; wherein the first initial power level for the first PUSCH is derived from at least a first cell specific initial target PUSCH power parameter and at least one UE specific initial target PUSCH power parameter; wherein the second initial power level for the second PUSCH is derived from at least one or more of the following: the first cell specific initial target PUSCH power parameter; a second cell specific initial target PUSCH power parameter; the first cell specific initial target PUSCH parameter and a cell specific initial target PUSCH power offset parameter; a cell specific initial target preamble power parameter and the cell specific initial target PUSCH power offset parameter; the cell specific initial target preamble power parameter and a cell specific initial target preamble power offset parameter; or the cell specific initial target preamble power parameter, the cell specific initial target preamble power offset parameter and the cell specific initial target PUSCH power offset parameter; wherein the second cell specific initial target PUSCH power parameter is different from the first cell specific initial target PUSCH power parameter; and wherein the cell specific initial target power offset parameter is different from the cell specific initial target preamble power offset parameter.

In some embodiments of the third example, the first cell specific initial target PUSCH power parameter is received on a cell specific broadcast channel and is defined for PUSCH transmissions with grant scheduling and/or RRC connection.

In some embodiments of the third example, the second cell specific initial target PUSCH power parameter is received on a cell specific broadcast channel and is defined for PUSCH transmissions without any RRC connection and grant scheduling.

In some embodiments of the third example, the cell specific initial target PUSCH power offset parameter is received on a cell specific broadcast channel and is defined for PUSCH without any RRC connection and grant scheduling.

In some embodiments of the third example, the cell specific initial target preamble power is received on a cell specific broadcast channel and is designed for a preamble.

In some embodiments of the third example, the cell specific initial target preamble power offset parameter is received on a cell specific broadcast channel and is defined for PUSCH transmissions with grant scheduling but without any RRC connection.

In some embodiments of the third example, the method further comprises determining a third target power level for transmitting the second physical uplink shared channel, wherein the third target power is derived from the second initial target power and a cell specific PUSCH power delta parameter.

In some embodiments of the third example, the cell specific PUSCH power delta parameter is received on a cell specific broadcast channel and is defined for retransmission of PUSCH without any RRC connection and grant scheduling.

In some embodiments of the third example, the method further comprises: determining a third target power level for transmitting the second physical uplink shared channel, wherein the third target power is derived from the second cell specific initial target PUSCH power parameter, the cell specific initial target preamble power offset parameter and a cell specific PUSCH power delta offset parameter.

In some embodiments of the third example, the second initial power level is further derived from a transmission format compensation offset parameter.

In some embodiments of the third example, there is a relationship between the transmission format compensation offset parameter and one or more of a modulation and coding set and a transport block size.

According to a fourth example, there is provided a method comprising: transmitting a first cell specific initial target PUSCH power parameter; transmitting at least one UE specific initial target PUSCH power parameter; transmitting a cell specific initial target preamble power parameter; transmitting a cell specific initial target preamble power offset parameter; transmitting one or more of: a second cell specific initial target PUSCH power parameter a cell specific initial target PUSCH power offset parameter; wherein the second cell specific initial target PUSCH power parameter is different from the first cell specific initial target PUSCH power parameter; wherein the cell specific initial target power offset parameter is different from the cell specific initial target preamble power offset parameter; receiving a first PUSCH provisioned using at least the first cell specific initial target PUSCH power parameter and the at least one UE specific initial target PUSCH power parameter; and receiving a second PUSCH provisioned using at least the least one or more of: the first cell specific initial target PUSCH power parameter; the second cell specific initial target PUSCH power parameter; the first cell specific initial target PUSCH parameter and the cell specific initial target PUSCH power offset parameter; the cell specific initial target preamble power parameter and the cell specific initial target PUSCH power offset parameter; the cell specific initial target preamble power parameter and the cell specific initial target preamble power offset parameter; or the cell specific initial target preamble power parameter, the cell specific initial target preamble power offset parameter and the cell specific initial target PUSCH power offset parameter.

In some embodiments of the fourth example, the first cell specific initial target PUSCH power parameter is transmitted on a cell specific broadcast channel and is defined for PUSCH transmissions with grant scheduling and/or RRC connection.

In some embodiments of the fourth example, the second cell specific initial target PUSCH power parameter is transmitted on a cell specific broadcast channel and is defined for PUSCH transmissions without any RRC connection and grant scheduling.

In some embodiments of the fourth example, the cell specific initial target PUSCH power offset parameter is transmitted on a cell specific broadcast channel and is defined for PUSCH without any RRC connection and grant scheduling.

In some embodiments of the fourth example, the cell specific initial target preamble power is transmitted on a cell specific broadcast channel and is designed for a preamble.

In some embodiments of the fourth example, the cell specific initial target preamble power offset parameter is transmitted on a cell specific broadcast channel and is defined for PUSCH transmissions with grant scheduling but without any RRC connection.

In some embodiments of the fourth, example the method further comprises transmitting a cell specific PUSCH power delta parameter.

In some embodiments of the fourth example, the cell specific PUSCH power delta parameter is transmitted on a cell specific broadcast channel and is defined for retransmission of PUSCH without any RRC connection and grant scheduling.

In some embodiments of the fourth example, the method further comprises receiving a third physical uplink shared channel provisioned using the second cell specific initial target PUSCH power parameter, the cell specific initial target preamble power offset parameter and a cell specific PUSCH power delta offset parameter.

In some embodiments of the fourth example, the method further comprises transmitting a transmission format compensation offset parameter and receiving the second physical uplink shared channel further provisioned using the transmission format compensation offset parameter.

In some embodiments of the fourth example, there is a relationship between the transmission format compensation offset parameter and one or more of a modulation and coding set and a transport block size.

According to a fifth example, there is provided a method comprising: transmitting one or more cell specific power parameters for reception by a UE; transmitting one or more UE specific power parameters for reception by a UE; transmitting one or more power parameters specific to a first physical uplink shared channel; transmitting one or more power parameters specific to a second physical uplink shared channel; receiving the first physical uplink shared channel on a first resource provisioned using the one or more physical uplink shared channel power parameters specific to the first physical uplink shared channel; and receiving the second physical uplink shared channel on a second resource provisioned using the one or more physical uplink shared channel power parameters specific to the second physical uplink shared channel; wherein the first resource and the second resource are at least one of: respective transmission beams; respective transmission beam pair links; respective panels; respective QCL groups; respective antenna ports; or respective transmission layers.

In some embodiments of the fifth example, the power parameters specific to the first physical uplink channel and the second power parameters specific to the second physical uplink channel include one or more of a respective PUSCH specific pathloss parameter, a respective PUSCH specific $P_{o\_UE\_PUSCH}$ parameter, or one or more respective PUSCH specific closed-loop factors.

In some embodiments of the fifth example, the one or more respective PUSCH closed-loop factors can be based on one or more of transmit power control or transmission format indications.

In some embodiments of the fifth example, the one or more cell specific power parameters include one or more of $P_{o\_PUSCH\_nominal}$ or a cell specific path loss compensation factor.

In some embodiments of the fifth example, the power parameters specific to the first physical uplink channel and the power parameters specific to the second physical uplink channel are represented as offsets from the one or more cell specific power parameters or the one or more UE specific power parameters.

According to a sixth example there is provided a method comprising: transmitting from a UE a first transmission in a first transmit beam of the UE in accordance with a power control process wherein a first pathloss value used in the power control process is derived from a first received power associated with a first receive beam of the UE associated with the first transmit beam of the UE when the UE has transmit/receive beam reciprocity with respect to the first transmit beam of the UE and the first receive beam of the UE; and transmitting from the UE a second transmission in a second transmit beam of the UE in accordance with the power control process wherein a second pathloss value used in the power control process is derived from second received powers associated a set of receive beams of the UE when the UE does not have the transmit/receive beam reciprocity with respect to the second transmit beam of the UE.

In some embodiments of the sixth example, the first transmission is a first sounding reference signal and the second transmission is a second sounding reference signal.

In some embodiments of the sixth example, the first transmit beam of the UE and the second transmit beam of the UE have the same index.

In some embodiments of the sixth example, the second pathloss value is derived from an average of the second receive powers.

In some embodiments of the sixth example, the first received power is associated with a first network side beam.

In some embodiments of the sixth example the first received power is associated with a first network side beam and a second received power is associated with a second network side beam, and where the first pathloss value is further derived from the second received power.

According to a seventh example there is provided a method comprising: transmitting from a UE a first transmission in accordance with a power control process wherein a first pathloss value used in the power control process is derived from a first received power associated with one SS block index when the UE has transmit/receive beam reciprocity information about first network side beams; and transmitting from the UE a second transmission in accordance with the power control process wherein a second pathloss value used in the second power control process is derived from second received powers associated with more than one SS block index when the UE does not have transmit/receive beam reciprocity information about second network side beams.

In some embodiments of the seventh example, the first transmission is a first PRACH transmission and the second transmission is a second PRACH transmission.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A method for uplink transmissions, comprising:
   acquiring, by a user equipment (UE), a power parameter specific to a physical uplink shared channel (PUSCH);
   determining, by the UE, a pathloss value for the PUSCH in accordance with a downlink reference signal (DL RS) configuration, the DL RS configuration being associated with a resource index identifying an antenna port;
   deriving, by the UE, a transmission power for the PUSCH in accordance with the power parameter and the pathloss value; and
   transmitting, by the UE, the PUSCH on the antenna port at the transmission power.

2. The method of claim 1, wherein the DL RS configuration comprises a synchronization signal (SS) block configuration for reference signal received power (RSRP) measurement, the SS block configuration indicating a SS block comprising a downlink synchronization signal, and a demodulation reference signal (DMRS) for a physical broadcast channel (PBCH).

3. The method of claim 1, wherein the DL RS configuration comprises a channel state information reference signal (CSI-RS) for DL mobility measurement, or a CSI-RS for downlink beam management measurement.

4. The method of claim 1, wherein the DL RS configuration comprises a DL RS transmission power, or a PUSCH specific resource index.

5. The method of claim 1, wherein the power parameter includes at least one of: a pathloss parameter specific to the PUSCH, an initial target PUSCH power parameter specific to the PUSCH, or a closed-loop factor specific to the PUSCH.

6. The method of claim 5, wherein the closed-loop factor is based on a transmit power control command or a transmission format indication.

7. The method of claim 1, wherein the power parameter comprises a common cell specific power parameter or a UE specific power parameter.

8. The method of claim 7, wherein the common cell specific power parameter includes a cell specific initial target PUSCH power parameter.

9. The method of claim 1, wherein the power parameter is represented as an offset from a common cell specific power parameter or a UE specific power parameter.

10. The method of claim 1, wherein the acquiring the power parameter comprises:
    receiving, by the UE, the power parameter from a base station through a radio resource control message.

11. A device comprising:
    at least one processor;
    a computer-readable medium, having stored thereon computer-executable instructions that, when executed by the at least one processor cause the device to:
        acquire a power parameter specific to a physical uplink shared channel (PUSCH);
        determine a pathloss value for the PUSCH in accordance with a downlink reference signal (DL RS) configuration, the DL RS configuration being associated with a resource index identifying an antenna port;
        derive a transmission power for the PUSCH in accordance with the power parameter and the pathloss value; and
        transmit the PUSCH on the antenna port at the transmission power.

12. The device of claim 11, wherein the DL RS configuration comprises a synchronization signal (SS) block configuration for reference signal received power (RSRP) measurement, the SS block configuration indicating a SS block comprising a downlink synchronization signal, and a demodulation reference signal (DMRS) for a physical broadcast channel (PBCH).

13. The device of claim 11, wherein the DL RS configuration comprises a channel state information reference signal (CSI-RS) for DL mobility measurement, or a CSI-RS for downlink beam management measurement.

14. The device of claim 11, wherein the DL RS configuration comprises a DL RS transmission power, or a PUSCH specific resource index.

15. The device of claim 11, wherein the power parameter includes at least one of: a pathloss parameter specific to the PUSCH, an initial target PUSCH power parameter specific to the PUSCH, or a closed-loop factor specific to the PUSCH.

16. The device of claim 15, wherein the closed-loop factor is based on a transmit power control command or a transmission format indication.

17. The device of claim 11, wherein the power parameter comprises a common cell specific power parameter or a UE specific power parameter.

18. The device of claim 17, wherein the common cell specific power parameter includes a cell specific initial target PUSCH power parameter.

19. The device of claim 11, wherein the power parameter is represented as an offset from a common cell specific power parameter or a UE specific power parameter.

20. The device of claim 11, wherein the computer-executable instructions that cause the device to acquire the power parameter comprise computer-executable instructions that, when executed by the at least one processor, cause the device to receive the power parameter from a base station through a radio resource control message.

* * * * *